(12) United States Patent
You et al.

(10) Patent No.: US 10,548,122 B2
(45) Date of Patent: Jan. 28, 2020

(54) MTC DEVICE OPERATING IN ONLY PARTIAL BAND OF SYSTEM BAND OF CELL AND DOWNLINK CONTROL CHANNEL RECEPTION

(71) Applicant: LG ELECTRONICS INC., Seoul (KR)

(72) Inventors: Hyangsun You, Seoul (KR); Yunjung Yi, Seoul (KR); Inkwon Seo, Seoul (KR); Suckchel Yang, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 156 days.

(21) Appl. No.: 15/528,419

(22) PCT Filed: Nov. 19, 2015

(86) PCT No.: PCT/KR2015/012435
§ 371 (c)(1),
(2) Date: May 19, 2017

(87) PCT Pub. No.: WO2016/080772
PCT Pub. Date: May 26, 2016

(65) Prior Publication Data
US 2017/0359805 A1    Dec. 14, 2017

Related U.S. Application Data

(60) Provisional application No. 62/082,581, filed on Nov. 20, 2014, provisional application No. 62/088,537, (Continued)

(51) Int. Cl.
*H04W 4/00* (2018.01)
*H04W 72/04* (2009.01)
*H04W 4/70* (2018.01)

(52) U.S. Cl.
CPC ........... *H04W 72/042* (2013.01); *H04W 4/70* (2018.02)

(58) Field of Classification Search
CPC .... H04W 4/70; H04W 72/042; H04L 1/0039; H04L 5/0094; H04L 5/005; H04L 5/0051; H04L 5/001
See application file for complete search history.

(56) References Cited

U.S. PATENT DOCUMENTS

2013/0301549 A1* 11/2013 Chen ................. H04W 4/90
370/329
2013/0308563 A1* 11/2013 Xiao ................. H04L 1/0007
370/329

(Continued)

FOREIGN PATENT DOCUMENTS

EP      2693677 A1    2/2014

OTHER PUBLICATIONS

NTT DOCOMO, "Design of EPDCCH search space for low cost MTC", R1-144964, 3GPP TSG RAN WG1 Meeting #79 R1-144964 San Francisco, USA, Nov. 17-21, 2014, pp. 1-4.
Sony, "MTC Operation using ePDCCH", R1-145019, 3GPP TSG-RAN WG1 Meeting #79 R1-145019 San Francisco, USA, Nov. 17-21, 2014, pp. 1-17.

(Continued)

*Primary Examiner* — Abdelillah Elmejjarmi
(74) *Attorney, Agent, or Firm* — Birch, Stewart, Kolasch & Birch, LLP

(57) ABSTRACT

The disclosure of the present specification provides a method for receiving a downlink control channel in a machine type communication (MTC) device configured to operate in only a partial band of the system band of a cell. The method may comprise the steps of: considering the number of physical resource block (PRB) pairs, to which a downlink control channel can be mapped, to be one of 2, 4, and 8; when the considered number of PRB pairs is greater than the number of PRB pairs to which the downlink control channel is actually mapped, determining that the downlink (Continued)

control channel is not included in PRB pairs except the number of PRB pairs to which the downlink control channel is actually mapped; and receiving the downlink control channel in only as many PRB pairs as the number of PRB pairs to which the downlink control channel is actually mapped, on the basis of the determination.

10 Claims, 24 Drawing Sheets

Related U.S. Application Data filed on Dec. 5, 2014, provisional application No. 62/149,687, filed on Apr. 20, 2015, provisional application No. 62/150,817, filed on Apr. 21, 2015, provisional application No. 62/161,980, filed on May 15, 2015.

(56) References Cited

U.S. PATENT DOCUMENTS

| | | | |
|---|---|---|---|
| 2014/0010190 A1* | 1/2014 | Seo | H04L 5/0032 370/329 |
| 2014/0092815 A1* | 4/2014 | Ye | H04L 1/00 370/329 |
| 2014/0204868 A1 | 7/2014 | Lin | |
| 2014/0314042 A1* | 10/2014 | Kim | H04L 1/0072 370/329 |
| 2015/0146672 A1* | 5/2015 | Wu | H04W 72/04 370/329 |

OTHER PUBLICATIONS

ZTE, "Physical downlink control channel for MTC enhancement", R1-144817, 3GPP TSG RAN WG1 Meeting #79 R1-144817 San Francisco, USA, Nov. 17-21, 2014, pp. 1-5.

* cited by examiner

MTC DEVICE OPERATING IN ONLY PARTIAL BAND OF SYSTEM BAND OF CELL AND DOWNLINK CONTROL CHANNEL RECEPTION

CROSS REFERENCE TO RELATED APPLICATIONS

This application is the National Phase of PCT International Application No. PCT/KR2015/012435, filed on Nov. 19, 2015, which claims priority under 35 U.S.C. 119(e) to U.S. Provisional Application Nos. 62/082,581 filed on Nov. 20, 2014, 62/088,537 filed on Dec. 5, 2014, 62/149,687 filed on Apr. 20, 2015, 62/150,817 filed on Apr. 21, 2015, and 62/161,980 filed on May 15, 2015, all of which are hereby expressly incorporated by reference into the present application.

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts AMMO (multiple input multiple output) having maximum four antennas. Recently, a discussion of 3GPP LTE-A (LTE-Advanced) which is the evolution of the 3GPP LTE is in progress.

As disclosed in 3GPP TS 36.211 V10.4.0 (2011-12) "Evolved Universal Radio Access (E-UTRA): Physical Channels and Modulation (Release 10)", a physical channel in LTE may be classified into a downlink channel such as a physical downlink shared channel (PDSCH) and a physical uplink control channel (PDCCH), a physical hybrid-ARQ indicator Channel (PHICH), and uplink channels such as a physical uplink shared channel (PUSCH), and a physical uplink control channel (PUCCH).

Meanwhile, in recent years, communication, i.e., machine type communication (MTC), occurring between devices or between a device and a server without a human interaction, i.e., a human intervention, is actively under research. The MTC refers to the concept of communication based on an existing wireless communication network used by a machine device instead of a user equipment (UE) used by a user.

Since the MTC has a feature different from that of a normal UE, a service optimized to the MTC may differ from a service optimized to human-to-human communication. In comparison with a current mobile network communication service, the MTC can be characterized as a different market scenario, data communication, less costs and efforts, a potentially great number of MTC devices, wide service areas, low traffic for each MTC device, etc.

As a way for decreasing the costs of an MTC device, the MTC device may use a reduced band only, that is, a sub-band.

However, when the mobile station operates only in a reduced band, that is, a subband rather than a system bandwidth of a cell, the MTC device can not correctly receive the existing (conventional) PDCCH transmitted from a base station over an entire system band.

DETAILED DESCRIPTION OF THE INVENTION

Technical Problem

Accordingly, the disclosure of the specification has been made in an effort to solve the problem

Technical Solution

In order to achieve the above object, the present disclosure proposes introducing a new downlink control channel that is transmitted within the reduced bandwidth, for an MTC device operating in the reduced bandwidth (i.e., sub-band). Hereinafter, the new downlink control channel presented herein is referred to as 'a MTC evolved physical downlink control channel (M-EPDCCH)'. The M-EPDCCH may be one that uses the structure of the existing (conventional) EPDCCH as it is. Alternatively, the M-EPDCCH may be a modified version of the existing EPDCCH.

Specifically, in order to accomplish the above object, the disclosure of the present specification provides a method for receiving a downlink control channel in a machine type communication (MTC) device set to operate in only a partial band (i.e., a subset) of a system band of a cell. The method may comprise the steps of: considering the number of physical resource block (PRB) pairs to which a downlink control channel can be mapped may be one of 2, 4, and 8; determining that the downlink control channel is not included in PRB pairs except the number of PRB pairs to which the downlink control channel is actually mapped when the considered number of PRB pairs is greater than the number of PRB pairs to which the downlink control channel is actually mapped; and receiving the downlink control channel in only as many PRB pairs as the number of PRB pairs to which the downlink control channel is actually mapped, on the basis of the determining step (determination).

The method may further comprise receiving a setting indicating that the number of PRB pairs to which the downlink control channel is mapped is one of 2, 4, and 8.

When the MTC device is set to use only 6 PRBs of a system bandwidth of the cell, the number of PRB pairs to which the downlink control channel is actually mapped may be one of 1, 3, and 6.

The determining step may comprise determining that the channel is punctured in 2 PRB pairs, or that the downlink control channel is rate-matched except for the 2 PRB pairs when the number of PRB pairs to which the downlink control channel is mapped is 8 and the number of PRB pairs to which the downlink control channel is actually mapped is greater than 6.

The determining step may comprise determining that the channel is punctured in one PRB pair, or that the downlink control channel is rate-matched except for the one PRB pair when the number of PRB pairs to which the downlink control channel is mapped is 3 and the number of PRB pairs to which the downlink control channel is actually mapped is greater than 4.

The determining step may comprises determining that the channel is punctured in one PRB pair, or that the downlink control channel is rate-matched except for the one PRB pair when the number of PRB pairs to which the downlink control channel is mapped is 2 and the number of PRB pairs to which the downlink control channel is actually mapped is greater than 1.

In order to accomplish the above object, the disclosure of the present specification may include a machine type communication (MTC) device that receives a downlink control channel when it is set to operate in only partial band of a system bandwidth of a cell. The MTC device may include an RF unit and a processor for controlling the RF unit. The processor may comprise considering that the number of physical resource block (PRB) pairs to which the downlink (DL) control channel can be mapped is one of 2, 4, and 8, respectively. Then, when the number of the considered PRB pairs is greater than the number of PRB pairs to which the downlink control channel is actually mapped, determining that the downlink control channel is not included in a PRB pair other than the number of PRB pairs to which the DL control channel is actually mapped. Then, the processor may receive the downlink control channel only by the number of PRB pairs to which the downlink control channel is actually mapped, based on the determination.

Advantageous Effects

According to embodiments of the present invention, the aforementioned problems of the existing technology will be solved.

DETAILED DESCRIPTION OF THE INVENTION

Figure 1:
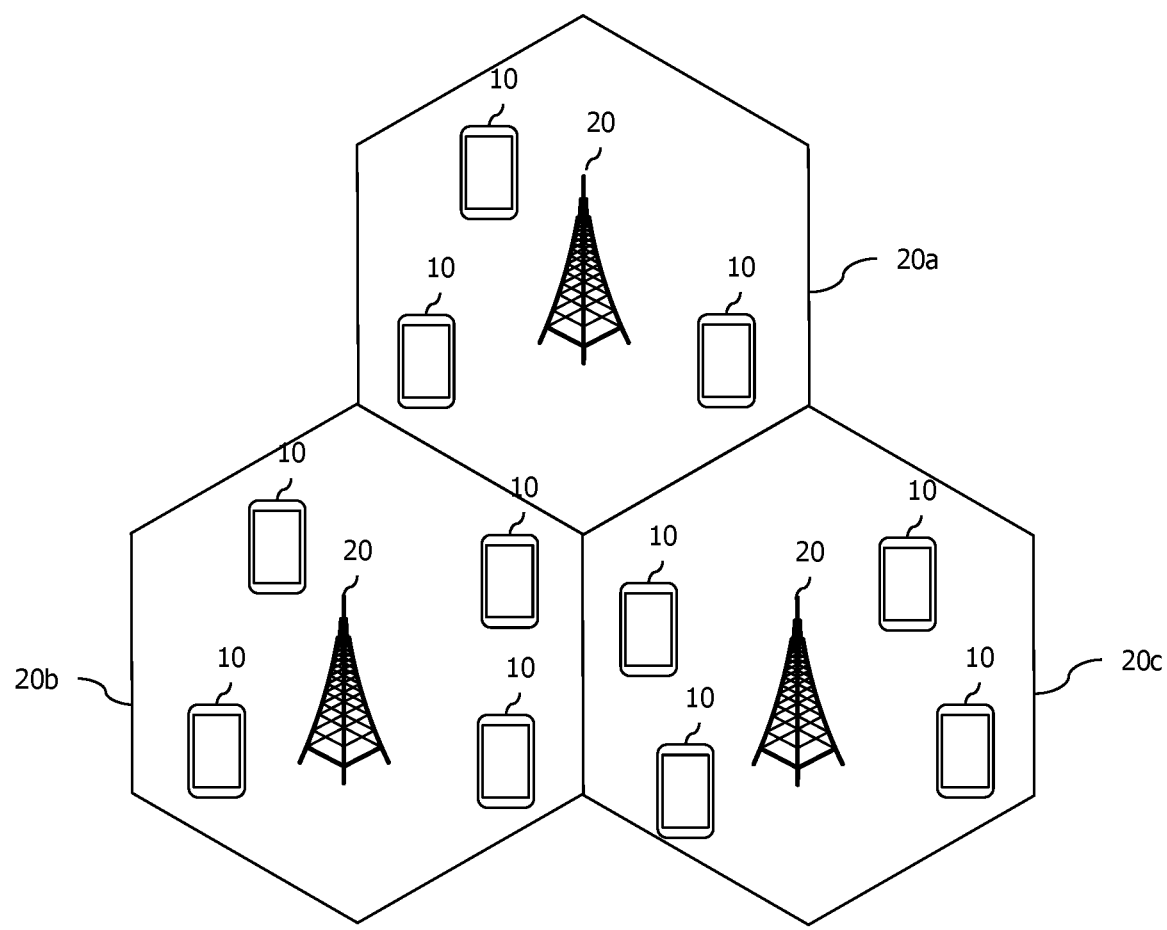
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

Further, the expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected" or "directly coupled" to another element, there are no intervening elements.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
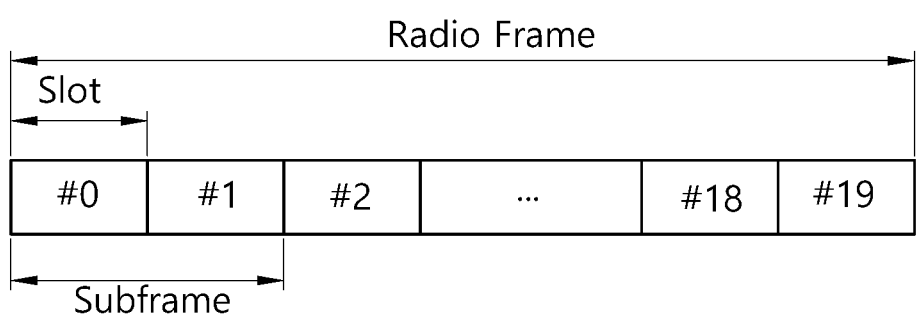
FIG. 2 illustrates the architecture of a radio frame according to frequency division duplex (FDD) of 3rd generation partnership project (3GPP) long term evolution (LTE).

FIG. 2 illustrates the architecture of a radio frame according to frequency division duplex (FDD) of 3rd generation partnership project (3GPP) long term evolution (LTE).

The wireless (radio) illustrated in FIG. 2 may refer to the section 5 of 3GPP TS 36.211 V10.4.0 (2011-12) "Evolved Universal Terrestrial Radio Access (E-UTRA); Physical Channels and Modulation (Release 10)".

Referring to FIG. 2, a radio frame includes 10 subframes, and one subframe includes two slots. The slots in the radio frame are numbered from 0 to 19. The time taken for one subframe to be transmitted is called a transmission time interval (TTI). TTI is a scheduling unit for data transmission. For example, the length of one radio frame is 10 ms, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of orthogonal frequency division multiplexing (OFDM) symbols. How many OFDM symbols are included in one slot may be changed according to a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
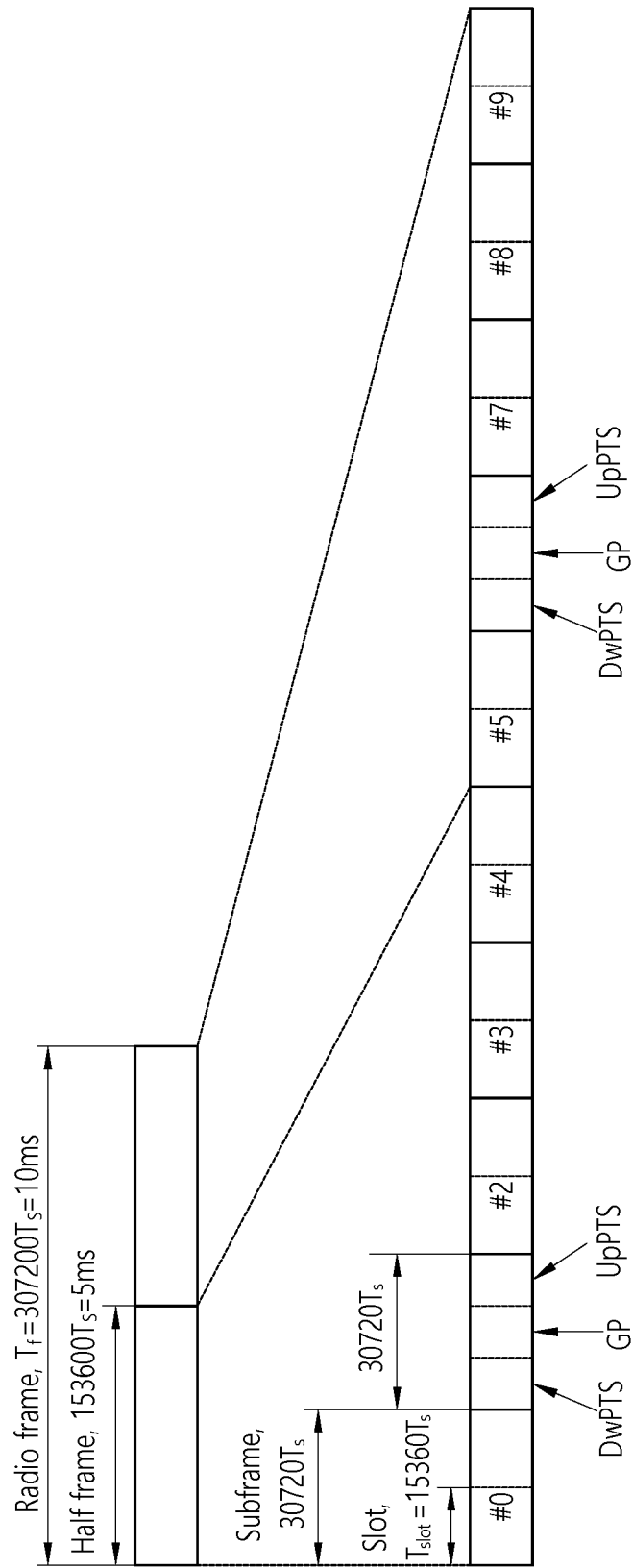
FIG. 3 illustrates the architecture of a downlink radio frame according to time division duplex (TDD) in 3GPP LTE.

FIG. 3 illustrates the architecture of a downlink radio frame according to time division duplex (TDD) in 3GPP LTE.

For this, 3GPP TS 36.211 V10.4.0 (2011-12) "Evolved Universal Terrestrial Radio Access (E-UTRA); Physical Channels and Modulation (Release 10)", Ch. 4 may be referenced, and this is for time division duplex (TDD).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| TDD UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

Figure 4:
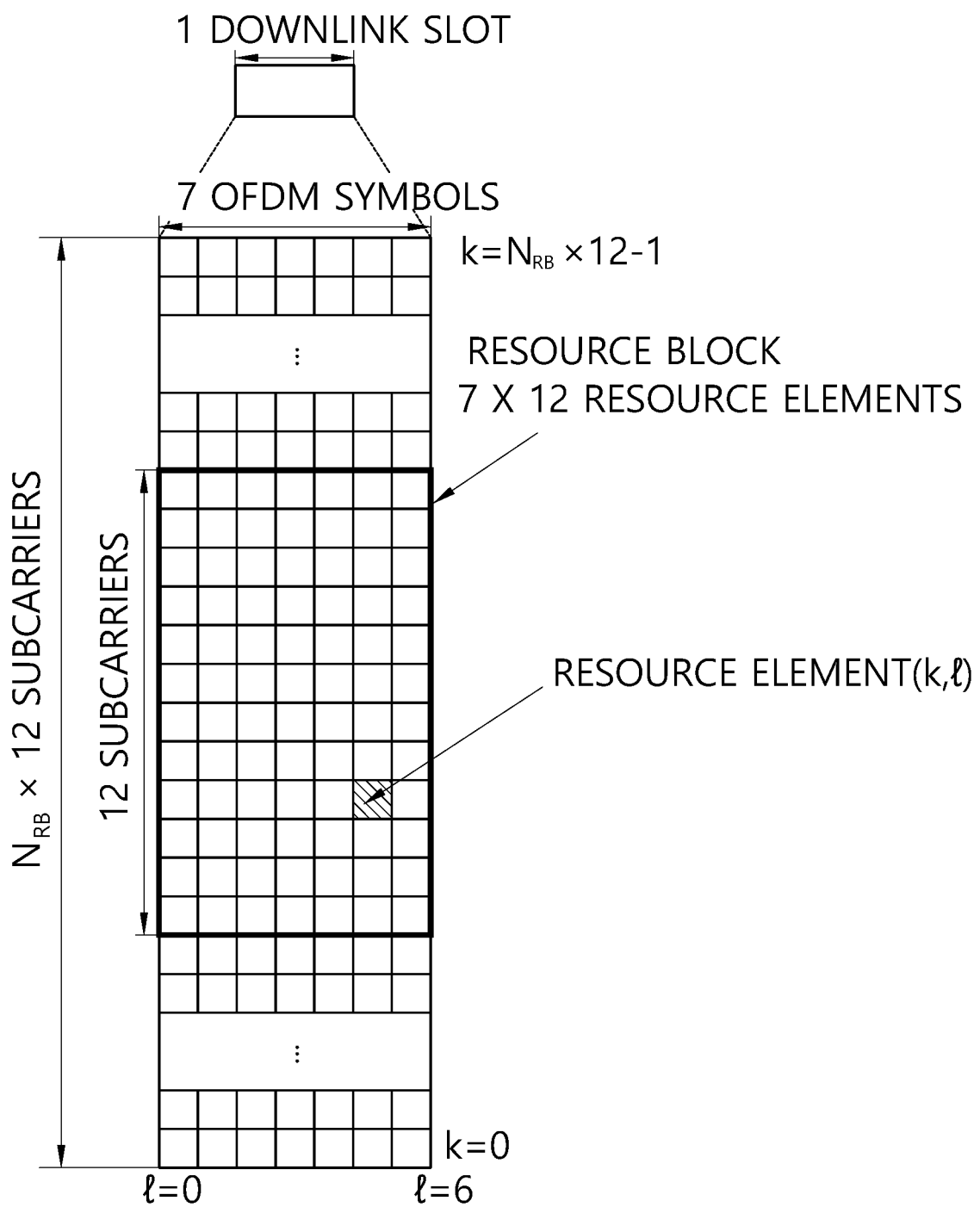
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
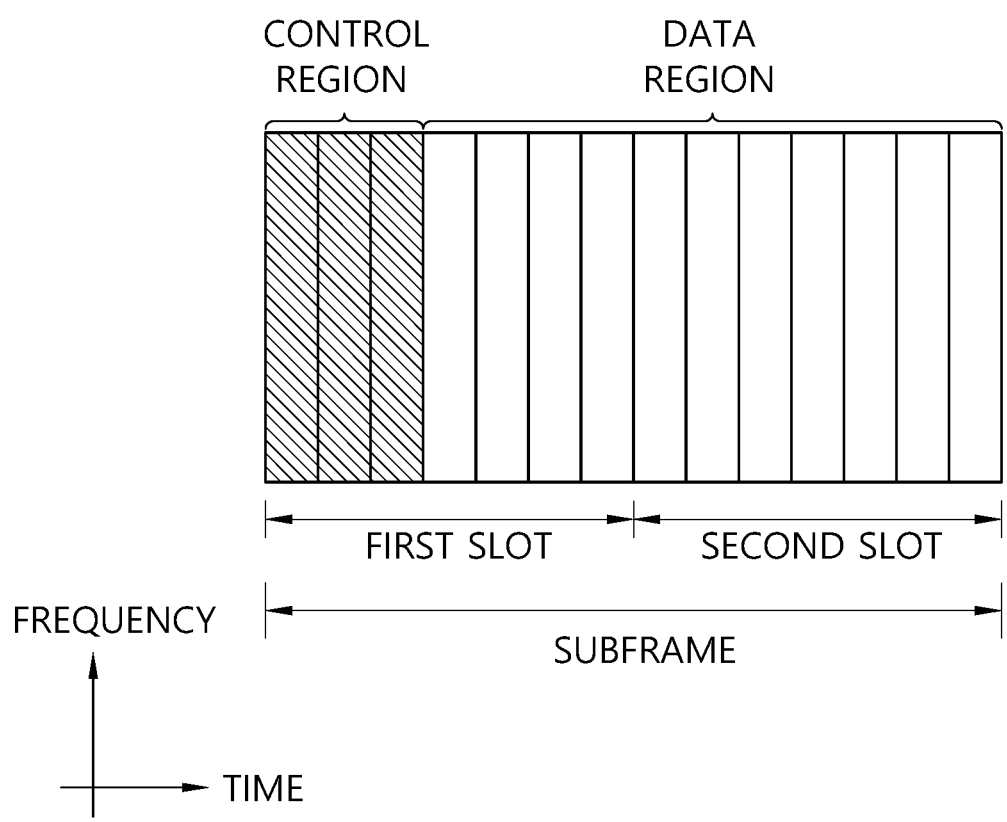
FIG. 5 illustrates the architecture of a downlink sub frame.

FIG. 5 illustrates the architecture of a downlink subframe.

In FIG. 5, assuming the normal CP, one slot includes seven OFDM symbols, by way of example.

The DL (downlink) subframe is split into a control region and a data region in the time domain. The control region includes up to first three OFDM symbols in the first slot of the subframe. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 6:
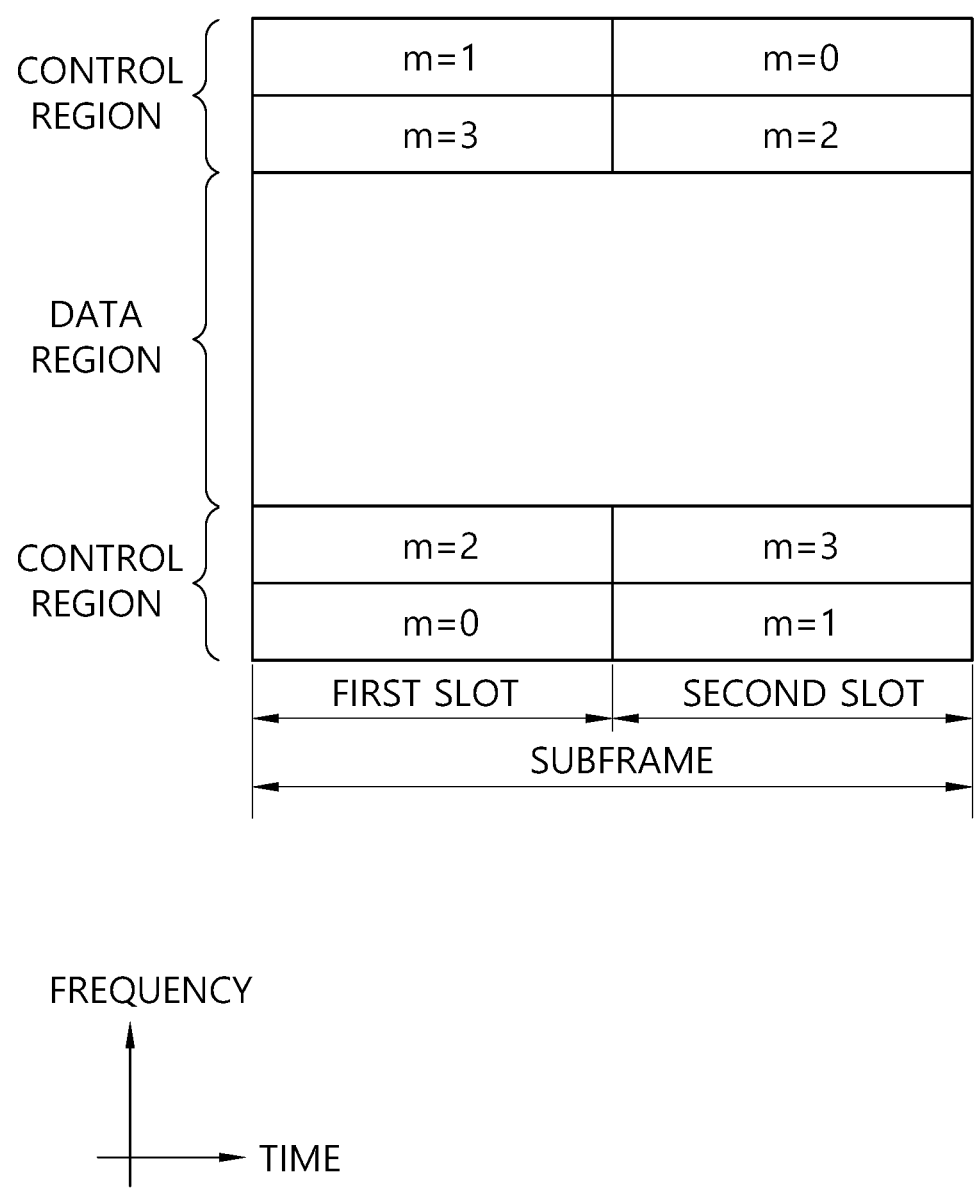
FIG. 6 illustrates the architecture of an uplink subframe in 3GPP LTE.

FIG. 6 illustrates the architecture of an uplink subframe in 3GPP LTE.

Referring to FIG. 6, the uplink subframe may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the subframe. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the subframe.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation>

Hereinafter, a carrier aggregation (CA) system will be described.

The CA system refers to aggregate a plurality of component carriers (CCs). Due to CA, the meaning of a legacy cell has been changed. According to CA, a cell may refer to a combination of a downlink (DL) CC and an uplink (UL) CC or a single DL CC.

Also, in CA, a cell may be classified as a primary cell, a secondary cell, and a serving cell. The primary cell may refer to a cell operating in a primary frequency and may refer to a cell in which a UE performs an initial connection establishment procedure (initial set level connection establishment procedure) or a connection re-establishment procedure with a base station (BS) or a cell indicated as a primary cell during a handover procedure. The secondary cell refers to a cell operating in a secondary frequency, which is configured once RRC connection is established and which is used to provide additional wireless resource.

As mentioned above, in the CC system, a plurality of CCs, i.e., a plurality of serving cells, may be supported, unlike a single carrier system.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier.

<EPDCCH (Enhanced Physical Downlink Control Channel)>

Meanwhile, a PDCCH is monitored in a limited area called a control area within a subframe, and a CRS transmitted in the entire band is used to demodulate the PDCCH. As types of control information is varied and an amount of control information is increased, flexibility of scheduling is lowered only by the legacy PDCCH. Also, in order to reduce a burden of CRS transmission, an enhanced PDCCH (EPDCCH) has been introduced.

Figure 7:
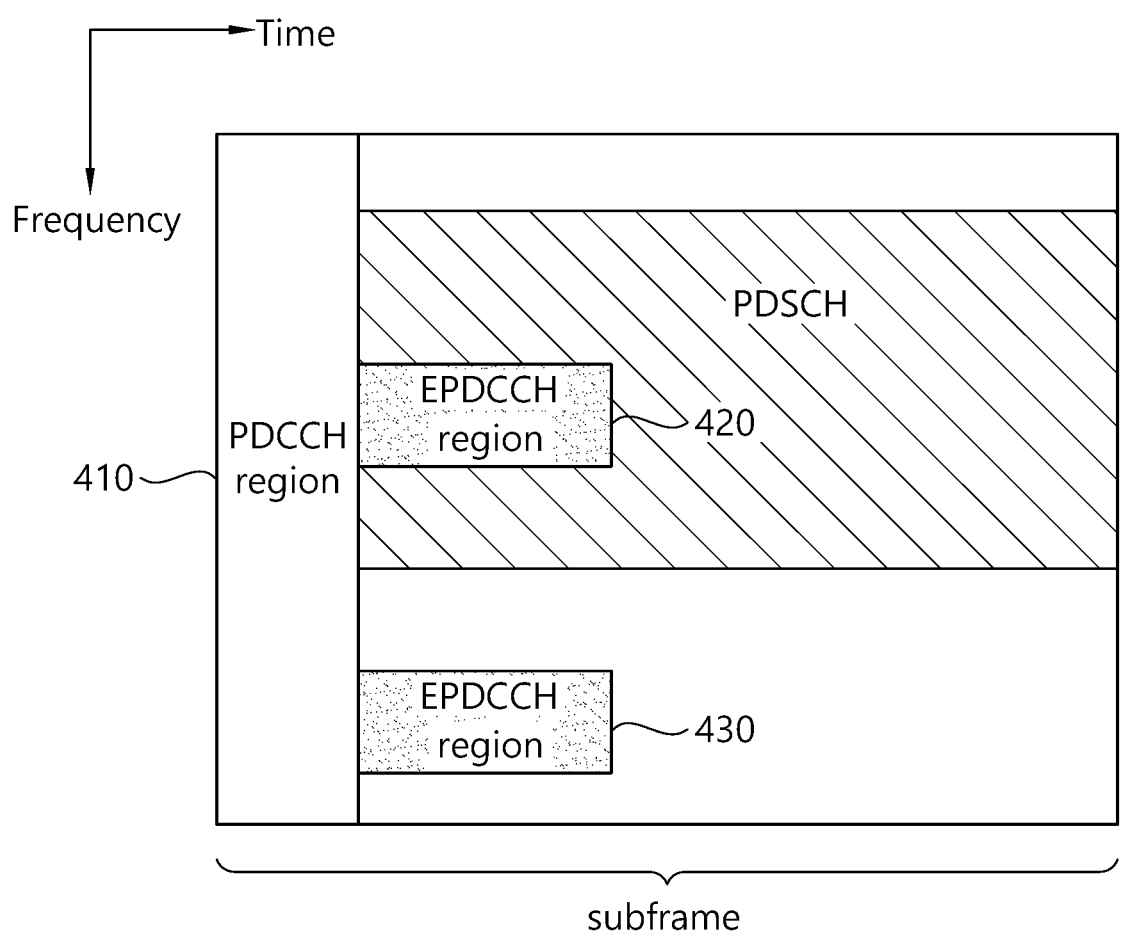
FIG. 7 is an example of a subframe having an EPDCCH.

FIG. 7 is an example of a subframe having an EPDCCH.

A subframe may include zero or one PDCCH region 410 and zero or more EPDCCH regions 420 and 430.

The EPDCCH regions 420 and 430 are regions in which a wireless device monitors an EPDCCH. The PDCCH region 410 is located within a maximum of four front OFDM symbols of the subframe, while the EPDCCH regions 420 and 430 may be flexibly scheduled in OFDM symbols after the PDCCH region 410.

One or more EPDCCH regions 420 and 430 are designated in a wireless device, and the wireless device may monitor an EPDCCH in the designated EPDCCH regions 420 and 430.

The number/position/size of the EPDCCH regions 420 and 430 and/or information regarding a subframe for monitoring the EPDCCH may be provided by a BS to the wireless device through an RRC message, or the like.

In the PDCCH region 410, a PDCCH may be demodulated on the basis of a CRS. In the EPDCCH regions 420 and 430, a demodulation (DM) RS, not the CRS, may be defined to demodulate the EPDCCH. An associated DM RS may be transmitted in the corresponding EPDCCH regions 420 and 430.

The EPDCCH regions 420 and 430 may each be used in scheduling for different cells. For example, an EPDCCH within the EPDCCH region 420 may carry scheduling information for a primary cell, and an EPDCCH within the EPDCCH region 430 may carry scheduling information for a secondary cell.

When an EPDCCH is transmitted in the EPDCCH regions 420 and 430 through multiple antennas, the same precoding as that of the EPDCCH may be applied to a DMRS within the EPDCCH regions 420 and 430.

Compared with a PDCCH which uses a CCE as a transmission resource unit, a transmission resource unit for an EPCCH is called an enhanced control channel element (ECCE). An aggregation level may be defined by a resource unit for monitoring an EPDCCH. For example, when 1 ECCE is a minimum resource for an EPDCCH, the aggregation level may be defined as L={1, 2, 4, 8, 16}.

Hereinafter, an EPDCCH search space may correspond to an EPDCCH region. In the EPDCCH search space, one or more EPDCCH candidates may be monitored at every one or more aggregation levels.

Now resource allocation for EPDCCH may be described.

EPDCCH may be transmitted using one or more ECCEs. ECCE may include multiple Enhanced Resource Element Groups (EREG). The ECCE may include 4 EREG or 8 EREG based on the subframe type and cyclic prefix (CP) according to the time division duplex (TDD) DL-UL setting. For example, an ECCE in a regular CP may include 4 EREGs, and an ECCE in an extended CP may include 8 EREGs.

A physical resource block (PRB) pair may refer to 2 PRBs having the same RB number in one subframe. The PRB pair may refer to the first PRB of the first slot and the second PRB of the second slot in the same frequency domain. In a regular CP, the PRB pair may include 12 subcarriers and 14 OFDM symbols and thus may contain 168 resource elements (REs).

The EPDCCH search space may be set to one or a plurality of PRB pairs. One PRB pair may include 16 EREGs. Thus, if the ECCE contains 4 EREGs, then the PRB pair may contain 4 ECCEs, and if the ECCE contains 8 EREGs, the PRB pair may contain 2 ECCEs.

Figure 8:
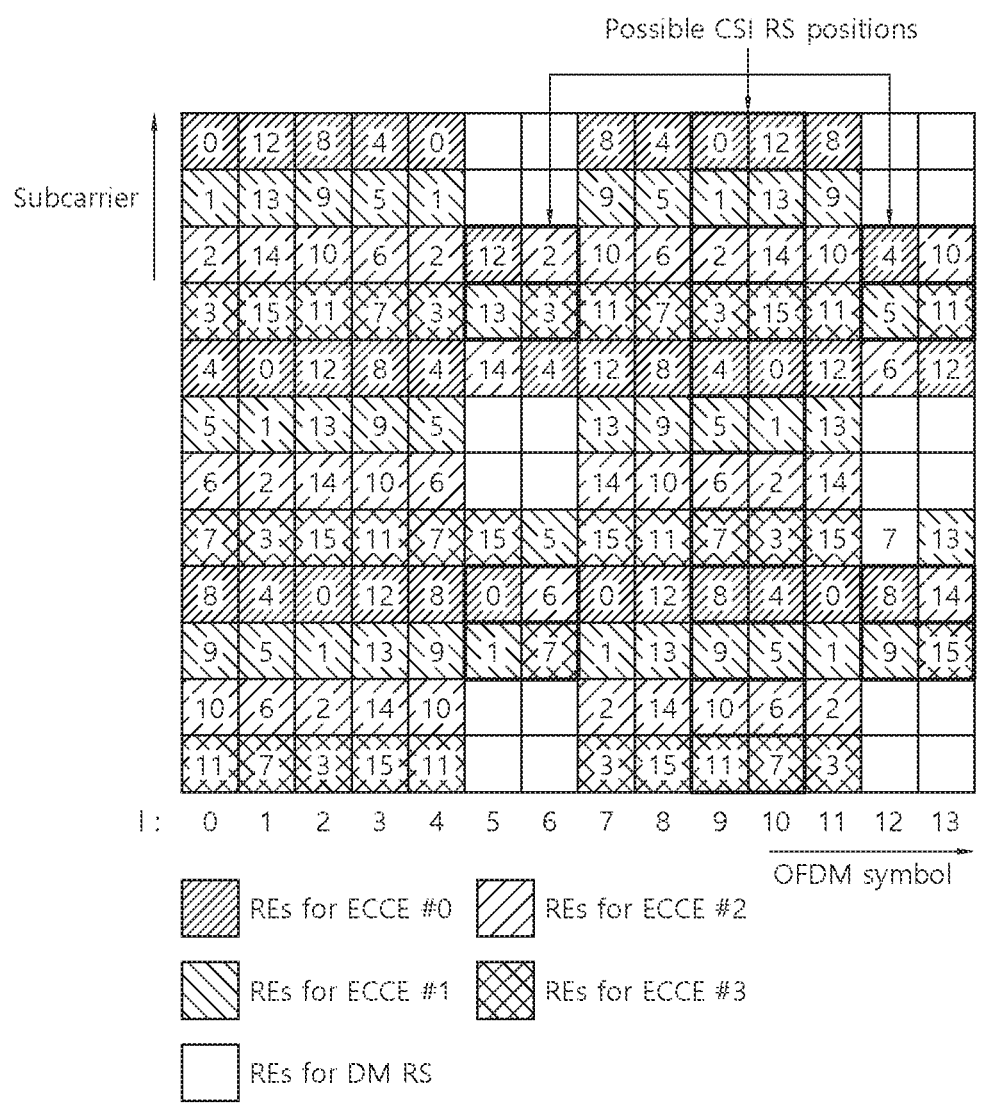
FIG. 8 shows an example of a PRB pair in one subframe.

FIG. 8 shows an example of a PRB pair in one subframe.

Hereinafter, a subframe may include 2 slots, and a PRB pair in one slot may include 7 OFDM symbols and 12 subcarriers, but the number of OFDM symbols and the number of subcarriers may be only examples.

The PRB pair may be all 168 (=12×14) REs in one subframe. The PRB pair may configure 16 EREGs from 144 REs, excluding 24 REs for demodulation reference signal (DM-RS). Thus, one EREG may contain 9 REs. However, a channel state information-reference signal (CSI-RS) or a cell-specific reference signal (CRS) may be arranged in addition to DM-RS in one PRB pair. In this case, the number of available REs may be reduced, and the number of REs included in one EREG may be reduced. The number of REs included in an EREG may be changed, but the number of EREGs included in one PRB pair may be 16 and may not change.

In this case, as shown in FIG. 8, for example, it may be possible to sequentially index an RE downward from a first subcarrier on the left side of a first OFDM symbol (1=0) (or the RE may be sequentially indexed upward from a first subcarrier under the first left OFDM symbol (1=0)). It may be assumed that 16 EREGs are indexed from 0 to 15. At this time, 9 REs having RE index 0 may be assigned to EREG 0. Similarly, 9 REs corresponding to the RE index k (k=0, . . . , 15) are assigned to EREG k.

A plurality of EREGs may be grouped together to define an EREG group. For example, when an EREG group having 4 EREGs is defined, it may be defined as EREG group #0={EREG 0, EREG 4, EREG 8, EREG 12}, EREG group #1={EREG 1, EREG 5, EREG 9, EREG 3}, EREG group #2={EREG 2, EREG 6, EREG 10, EREG 14}, and EREG group #3={EREG 3, EREG 7, EREG 11, EREG 15}. when an EREG group having 8 EREGs is defined, it may be defined as EREG group #0={EREG 0, EREG 2, EREG 4, EREG 6, EREG 8, EREG 10, EREG 12, EREG 14}, EREG group #1={EREG 1, EREG 3, EREG 5, EREG 7, EREG 9, EREG 11, EREG 13, EREG 15}.

Figure 10:
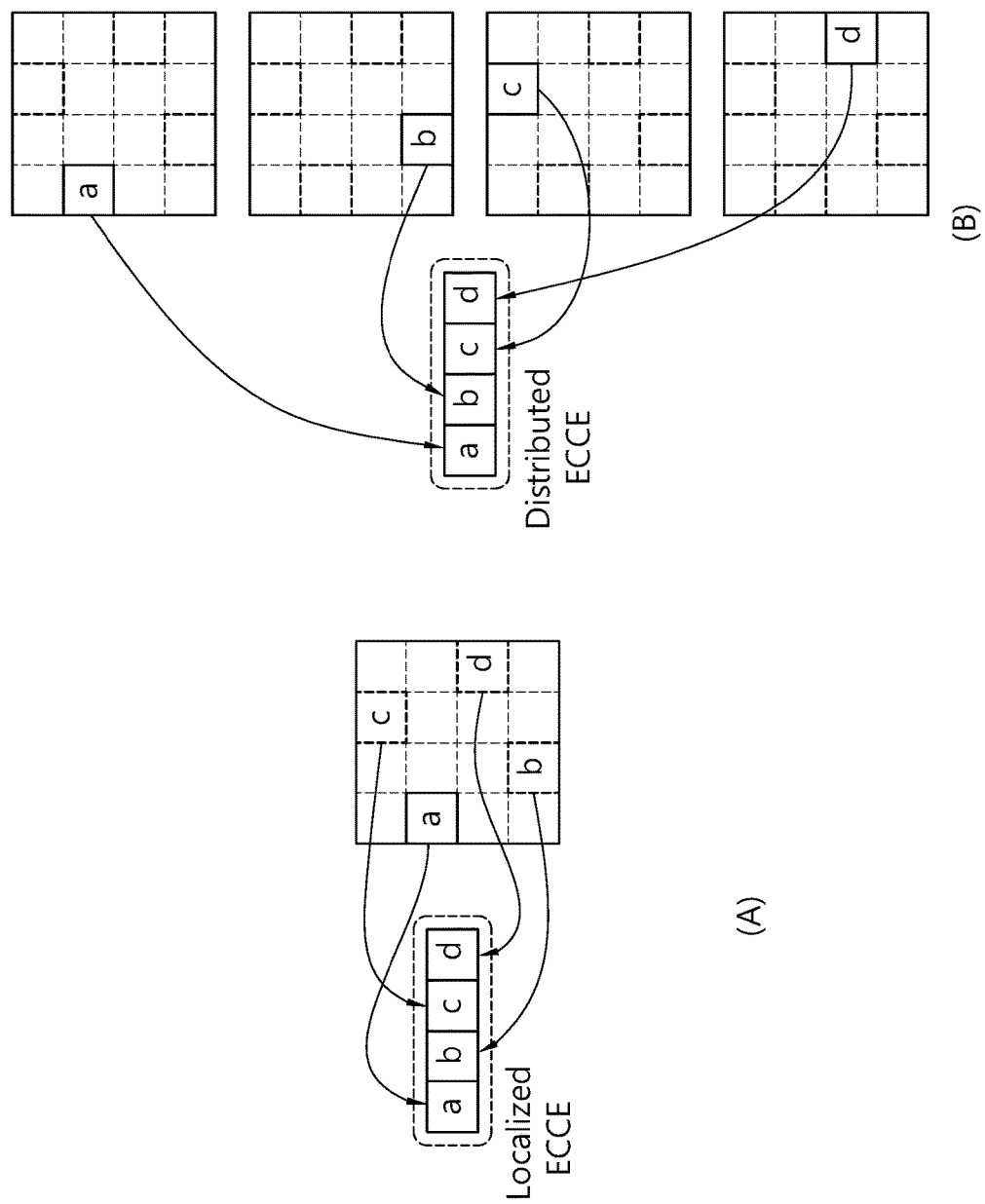
FIG. 10 shows examples of localized transmission and distributed transmission.

As described above, an ECCE includes 4 EREGs, and an ECCE in an extended CP may include 8 EREGs. The ECCE may be defined by the ERGE group. For example, FIG. 10 illustrates an example in which ECCE #0 includes an EREG group #0, ECCE #1 includes an EREG group #1, ECCE #2 includes an EREG group #2, and CCE #3 includes an EREG group #3.

There are two types of ECCE-to-EREG mapping: localized transmission and distributed transmission. An EREG group constituting one ECCE in the localized transmission may be selected from EREGs within one PRB pair. An EREG group constituting one ECCE in distributed transmission may be selected from EREGs of different PRB pairs from each other.

To obtain a precoding gain, an EPDCCH may be demodulated based on demodulation reference signals (DMRS), unlike the PDCCH which is demodulated based on a cell-specific reference signal (CRS).

Figure 9:
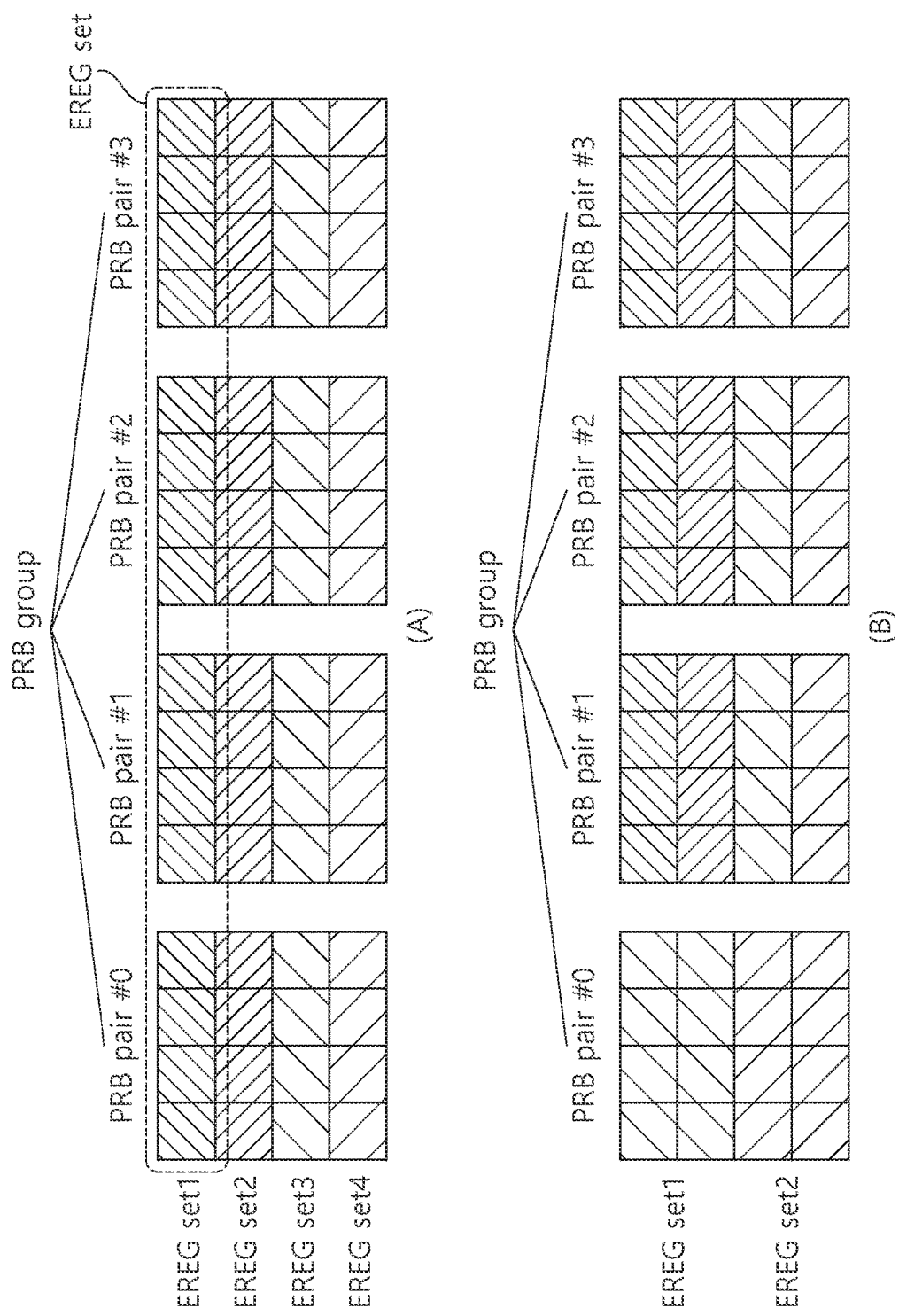
FIG. 9 shows an example of a PRB pair structure.

FIG. 9 shows an example of a PRB pair structure.

A PRB group may include 4 PRB pairs, but the number of the PRB groups is not limited.

FIG. 9 (A) shows an EREG set when an ECCE contains 4 EREGs. FIG. 9 (B) shows an EREG set when an ECCE contains 8 EREGs.

Hereinafter, it may be assumed that one ECCE includes 4 EREGs unless otherwise indicated.

An EPDCCH may support the localized transmission and the distributed transmission. EREGs constituting one ECCE in the localized transmission may be transmitted within one PRB pair. In the distributed transmission, an EREG constituting one ECCE may be transmitted in a plurality of PRB pairs.

FIG. 10 shows examples of localized transmission and distributed transmission.

FIG. 10 (A) shows an example of ECCE-to-EREG mapping according to localized transmission. The localized ECCE refers to ECCE used for the localized transmission. FIG. 10 (B) shows an example of ECCE-to-EREG mapping according to distributed transmission. The distributed ECCE refers to ECCE used for the distributed transmission.

An EREG set may be a set of EREGs used to construct a localized ECCE or a distributed ECCE. That is, an ECCE may include EREGs belonging to the same EREG set.

<Machine Type Communication (MTC) Communication>

Meanwhile, MTC will be described below.

Figure 11A:
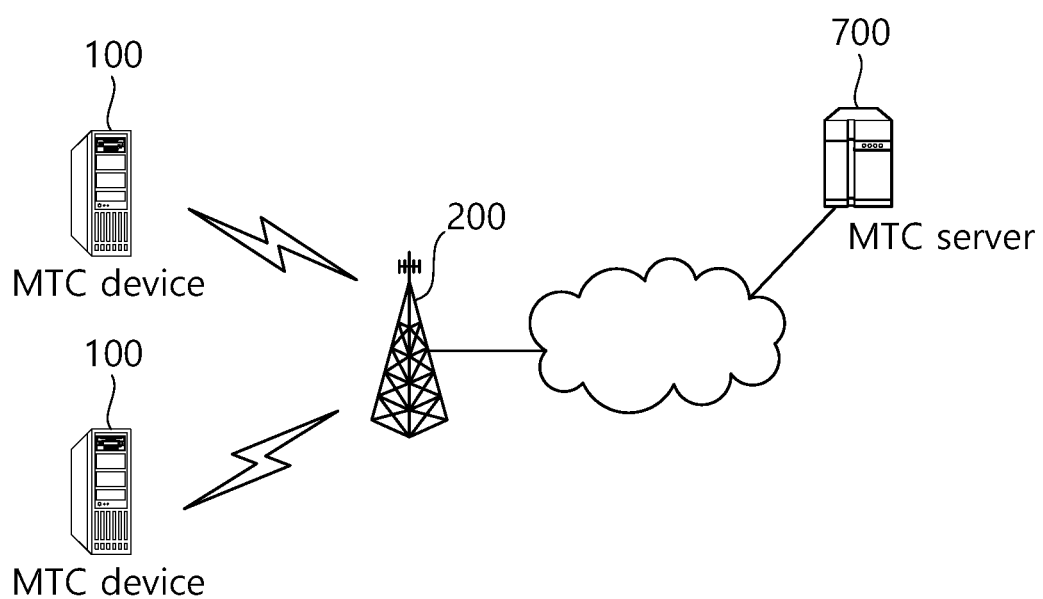
FIG. 11A shows an example of machine type communication (MTC) communication.

FIG. 11A shows an example of machine type communication (MTC) communication.

Figure 18:
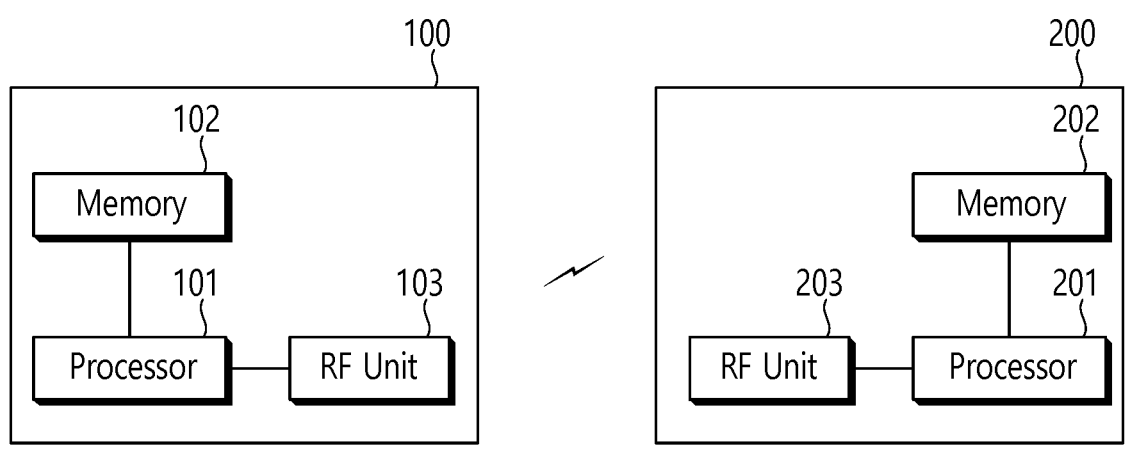
FIG. 18 is a block diagram illustrating a wireless communication system in which the present disclosure is implemented.

Referring to FIG. 18, Machine type communication (MTC) is an information exchange between MTC devices 100 without human interaction through a base station 200 or between an MTC device 100 and an MTC server 700 through the base station.

The MTC server 700 may be an entity which is communicating with the MTC device 100. The MTC server 700 may execute an MTC application and may provide an MTC specific service to the MTC device 100.

The MTC device 100 may be a wireless (or radio) device that provides MTC communication, to be fixed or movable.

A service provided through MTC may be different from a conventional service in the existing human intervention communication and a service using MTC may have various kinds of services such as tracking, metering, payment, medical service, and remote control. More specifically, services provided through MTC may include meter reading, water level measurement, utilization of surveillance cameras, inventory reporting of vending machines, and the like.

Since specificity of the MTC device is small and transmission/reception of uplink/downlink data occurs occasionally, it is effective to lower a cost of the MTC device and reduce a battery consumption in accordance with low data rate. The MTC device may have be characterized by low mobility, and thus a channel environment for the MTC device may hardly changes.

Meanwhile, the MTC may be also called internet of things (IoT), and thus the MTC device may be called an IoT device.

Figure 11B:
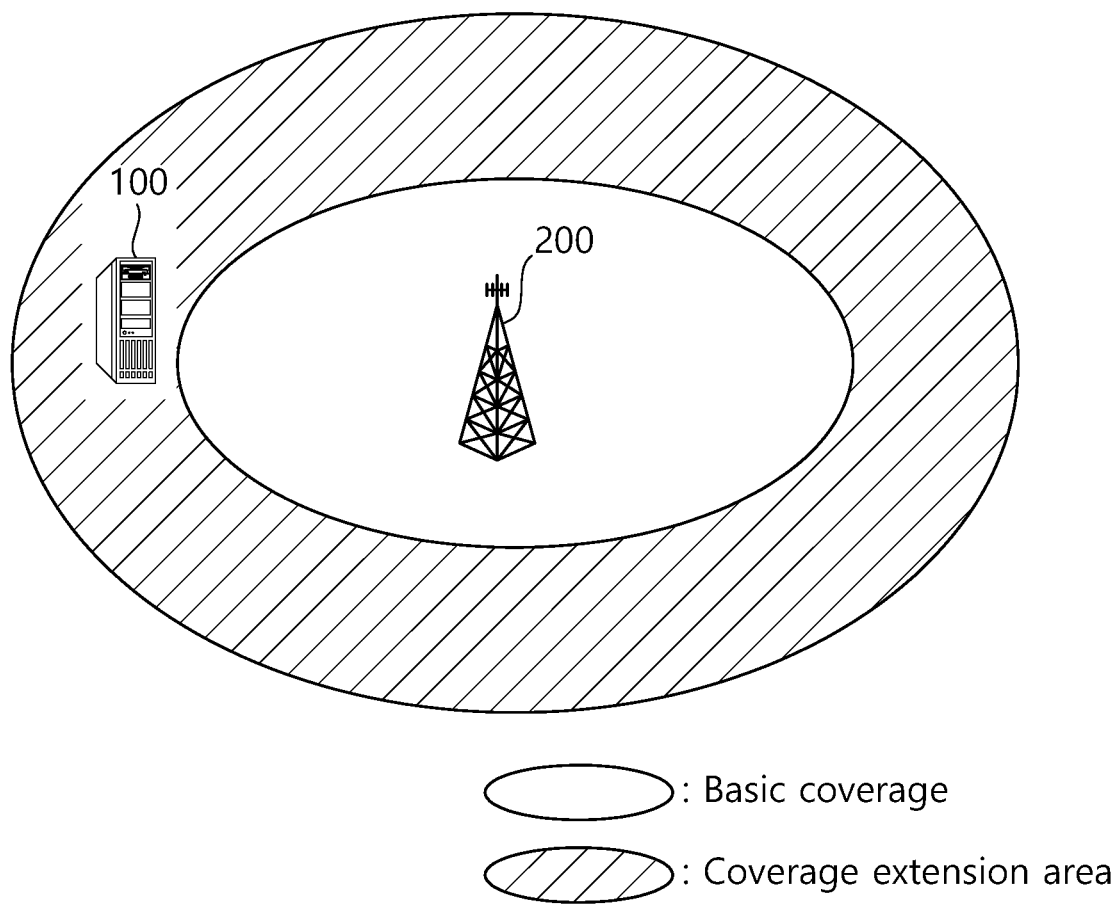
FIG. 11B illustrate an example of cell coverage extension for an MTC device.

FIG. 11B illustrate an example of cell coverage extension for an MTC device.

In recent years, various techniques for expanding cell coverage have been discussed considering expanding the cell coverage of a base station for the MTC device 100.

By the way, when the cell coverage is expanded and the base station transmits a downlink channel to an MTC device located in a coverage extension area, the MTC device may have difficulty in receiving the downlink channel due to a long distance and locations of devices, that are moved, for wireless communication.

Figure 11C:
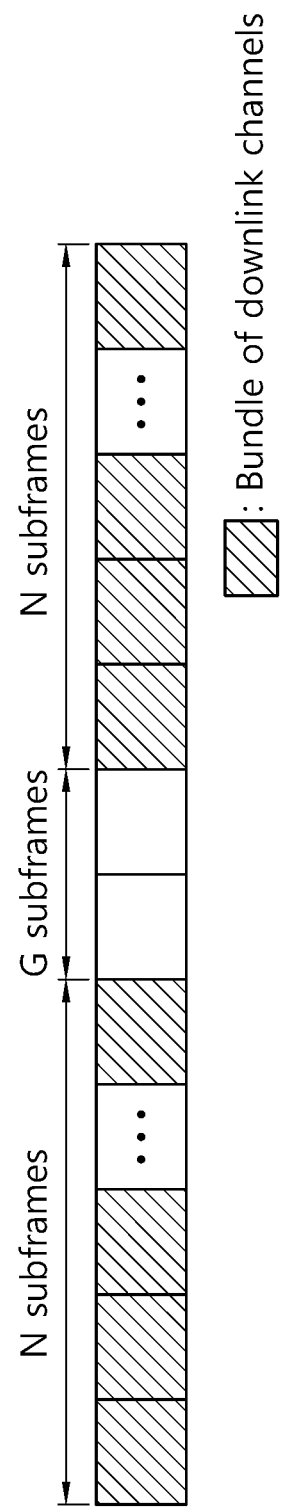
FIG. 11C is a diagram illustrating an example of transmitting a bundle of downlink channels.

FIG. 11C is a diagram illustrating an example of transmitting a bundle of downlink channels.

As known by referring to FIG. 11C, a base station (BS) may repeatedly transmit downlink channels (e.g., PDCCH and/or PDSCH) to an MTC device 100 located in a coverage extension area on a plurality of subframes (e.g., N subframes). As described above, the downlink channels repeated on the plurality of subframes are referred to as 'a bundle of downlink channels'.

Meanwhile, the MTC device may receive a bundle of downlink channels on the plurality of subframes and may decode all or some of the bundles, and thus a decoding success rate may increase.

Meanwhile, likewise, the MTC device located in the coverage extension area may also transmit a bundle of uplink channels (e.g., PUCCH and/or PUSCH) to the base station on multiple subframes.

Figure 12A:
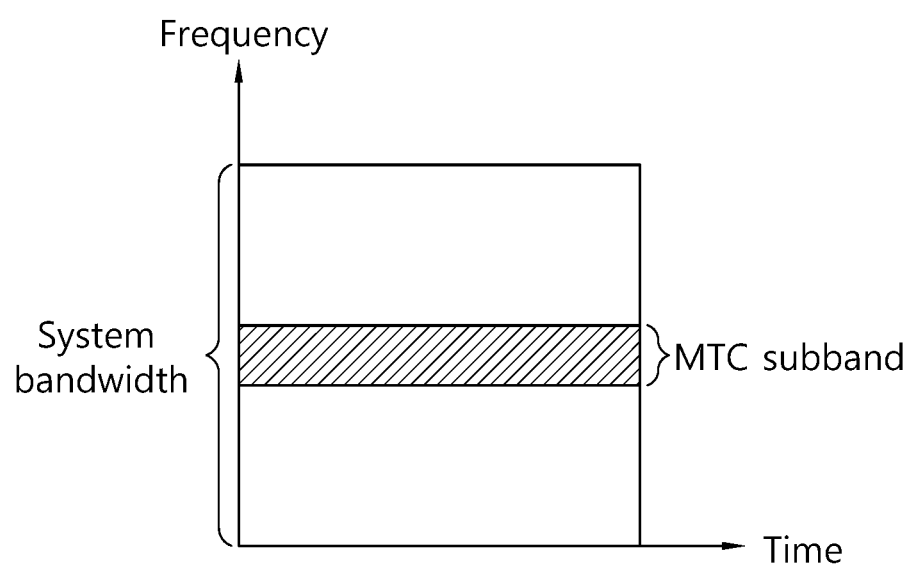
FIGS. 12A and 12B are schematic diagrams illustrating examples of sub-bands in which an MTC device operates.
Figure 12B:
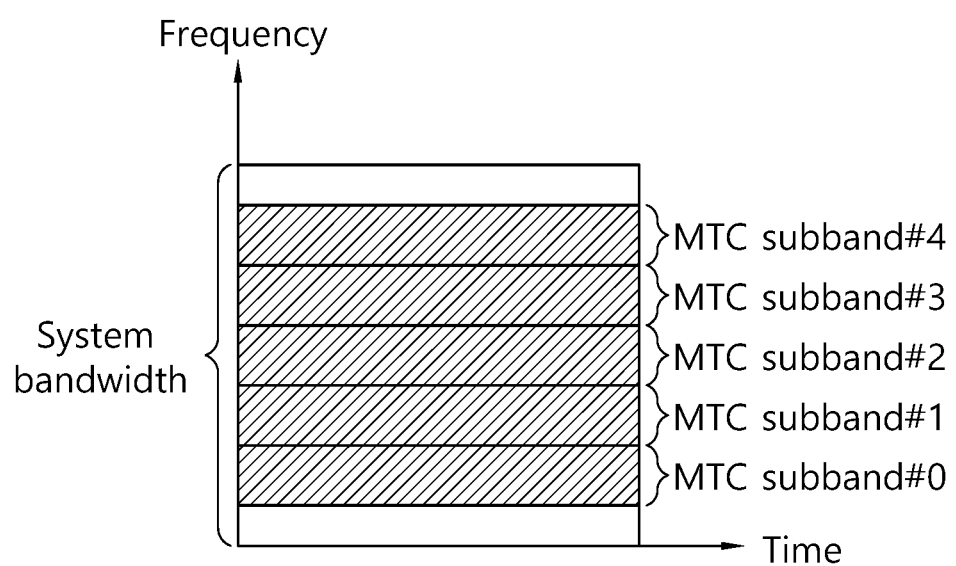

FIGS. 12A and 12B are schematic diagrams illustrating examples of sub-bands in which an MTC device operates.

As one approach (scheme) for low-cost of an MTC device, the MTC device may use sub-bands of, for example, about 1.4 MHz, irrespective of a system bandwidth of a cell as shown in FIG. 12A.

At this time, an area of a subband in which the MTC device operates may be located in a center region (e.g., center 6 PRBs) of the system bandwidth of the cell as shown in FIG. 12A.

Alternatively, as shown in FIG. 12B, to multiplex within one subframe between MTC devices, multiple subbands of the MTC device are placed in one subframe, and other subbands may be used between the MTC devices. At this time, most of the MTC devices may use a subband other than a center region (e.g., center 6 PRBs) of the system bandwidth of the cell.

Figure 13:
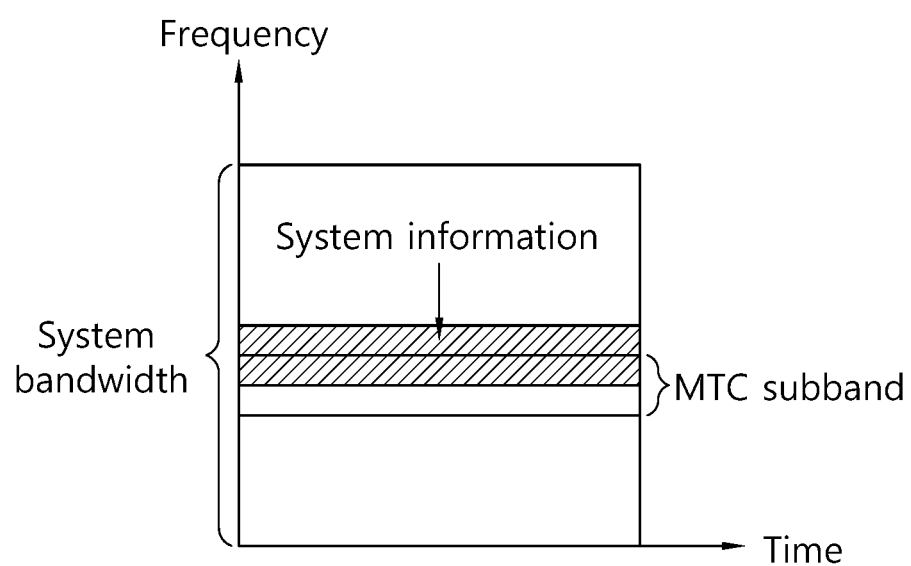
FIG. 13 shows an example in which a sub-band where an MTC device operates is overlapped with 6 PRBs in the middle.

FIG. 13 shows an example in which a sub-band where an MTC device operates is overlapped with center 6 PRBs.

As seen by referring to FIG. 13, an example is shown in which a sub-band on which the MTC device operates partially overlaps with center 6 PRBs of a system bandwidth of a cell.

Thus, in this case, there may be a problem that the MTC device can not receive system information such as a physical broadcast channel (PBCH) transmitted from a base station through center 6 PRBs of the system bandwidth of the cell.

On the other hand, an MTC device that operates on partial subbands may not properly receive the existing PDCCH transmitted from the base station over an entire system band. In addition, by considering multiplexing with PDCCHs transmitted to other common UEs, in an OFDM symbol region where the existing PDCCH is transmitted, it may be undesirable for the cell to transmit a PDCCH for the MTC device.

<Disclosure of the Present Specification>

Accordingly, disclosure of the present invention aims to provide a method to solve this problem.

Specifically, the disclosure of the present specification proposes to introduce a new downlink control channel that is transmitted within a reduced bandwidth, for an MTC device operating in the reduced bandwidth (i.e., subband). Hereinafter, the new downlink control channel presented in the present specification is referred to as an 'MTC enhanced PDCCH (M-EPDCCH)'. The M-EPDCCH may be one that substantially uses the conventional EPDCCH structure as it is. Alternatively, the M-EPDCCH may be a modified version of the conventional EPDCCH.

Hereinafter, it may be assumed that the new downlink control channel is used for the MTC device, but the new downlink control channel may be used for other common UEs, not the MTC device.

I. EPDCCH RE Mapping for 1, 3 or 5 EPDCCH-PRB-Set Sizes

In this section, for low-cost, when the MTC device operates at a reduced bandwidth (e.g., 6 PRBs) smaller than the system bandwidth of the cell, it is proposed to provide methods to support an EPDCCH-PRB-set having 1, 3, and 6 PRB sizes suited to this reduced bandwidth. A description in this section may be applied to not only 1, 3, and 6 PRB sizes, but also other PRB sizes (e.g., 5 PRB sizes).

I-1. First Method: Larger PRB Size EPDCCH RE Mapping and Puncturing/Rate-Matching A first method proposes to support an EPDCCH-PRB-set having 1, 3, and 6 PRB sizes with minimal modification while maintaining the existing EPDCCH form, for example, EPDCCH to ECCE mapping, ECCE RE mapping, ECCE RE mapping, compatible aggregation level (AL), the number of EPDCCH candidates being monitored, and the like.

Figure 14:
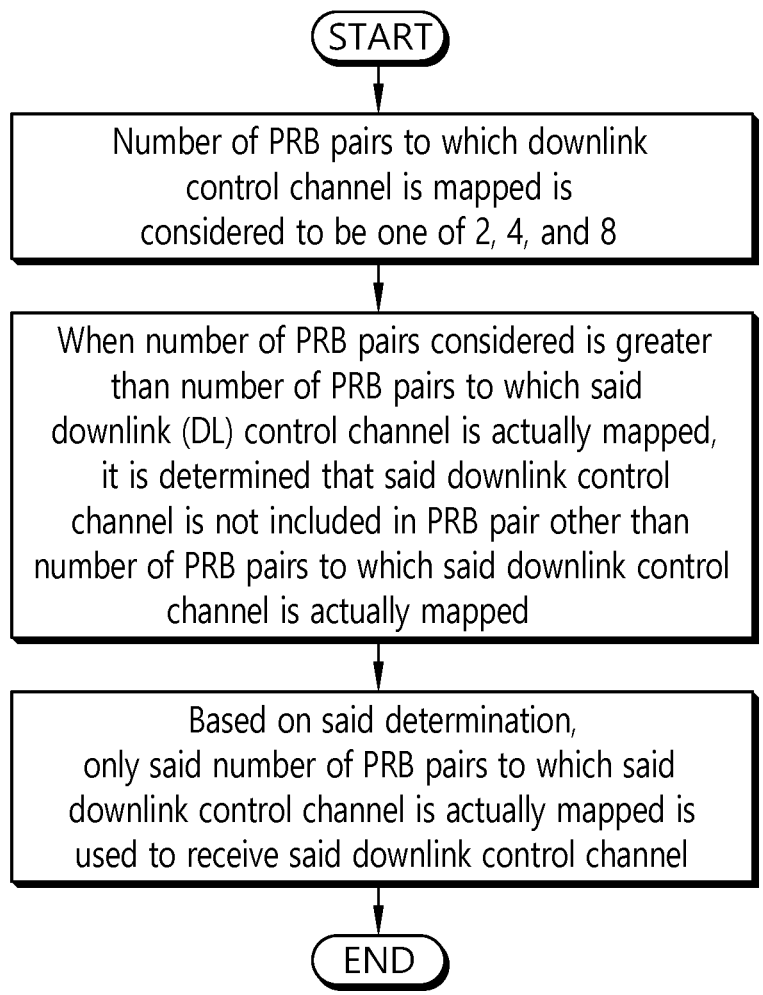
FIG. 14 is a diagram illustrating an example of a first method of the present specification.

FIG. 14 is a diagram illustrating an example of a first method of the present specification.

First, it may be considered that a number of PRB pairs to which an EPDCCH is mapped is one of 2, 4, and 8 in the MTC device.

However, when the number of the PRB pairs (to be considered) is greater than the number of PRB pairs to which the downlink control channel is actually mapped, the MTC device may determine that the EPDCCH is not included in a PRB pair other than the number of PRB pairs to which the EPDCCH is actually mapped. Moreover, based on the determination, the MTC device may monitor and receive EPDCCHs only by the number of PRB pairs to which the EPDCCH is actually mapped.

More specifically, to support an EPDCCH-PRB-set of 6 PRBs, the MTC device may assume an EPDCCH-PRB-set of the existing 8 PRBs. Moreover, the MTC device may assume that the EPDCCH is rate-matching or punctured within a resource area (RE) that is not exist in the band (i.e., 6 PRBs) in which the MTC device operates.

Similarly, to support an EPDCCH-PRB-set of 3 PRBs, the MTC device may operate assuming the EPDCCH-PRB-set of the existing 4 PRBs, the MTC device may assume that only 3 PRB resources are valid from a lowest (or highest) PRB index among 4 PRB resources indicated by the EPD-CCH-PRB-set. In addition, the MTC device may assume that the EPDCCH is rate-matched or punctured within the remaining invalid PRB resource region.

Likewise, to support an EPDCCH-PRB-set of one PRB, the MTC device may operate on the assumption of the EPDCCH-PRB-set of the existing 2 PRBs, and the MTC device may assume that only one PRB resource is valid from a lowest (or highest) PRB index among the 2 PRB resources indicated by the EPDCCH-PRB-set. In addition, the MTC device may assume that the EPDCCH is rate-matched or punctured within the remaining invalid PRB resource region.

At this time, in the case of an EPDCCH of distributed mapping, since ECCE resources are relatively evenly distributed in PRB resources of an EPDCCH-PRB-set, even if the EPDCCH is rate-matched (or punctured) in a PRB region that can be received by the MTC device, the number of RE resources to which one EPDCCH is transmitted may be reduced and the number of EPDCCH candidates that can be received by the MTC device may remain unchanged.

However, in the case of an EPDCCH of localized mapping, there may be (exist) EPDCCH candidate transmitted only through a PRB region that the MTC device can receive, and the MTC device may not receive the EPDCCH in the EPDCCH candidate. Accordingly, It may be unnecessary to include the EPDCCH candidate as an EPDCCH candidate in which the MTC device should perform blind decoding (BD). Thus, in the EPDCCH of the localized mapping, the EPDCCH candidate which can not receive the EPDCCH may be excluded from the blind decoding (BD), thereby reducing a burden of the blind decoding (BD) performed by the MTC device. At this time, the number of aggregation level (AL) for supporting an EPDCCH-PRB-set of 6, 3, and 1 PRB sizes and the number (i.e., the number of blind decoding (BD) based on aggregation level (AL)) of EPDCCH candidates to be monitored by the MTC device based on the AL may be as shown in the following table. Table 2 below is for localized mapping scheme in Case 1, Case 2, Case 3.

In the table above, $N^{Xp}_{RB}$ is the number of PRB pairs included in an EPDCCH-PRB-set.

At this time, in the case of an EPDCCH of the localized mapping, a index of a EPDCCH candidate in which the MTC device performs the blind decoding (BD) may be different according to a location of a subframe. This is because locations of ECCE resources constituting each EPDCCH candidate may change when the subframe changes. Thus, when the subframe changes, an index of an EPDCCH candidate transmitted only through a PRB resource in which the MTC device can not receive the EPDCCH may change. The following method may be used for an index of an EPDCCH candidate in which the MTC device performs blind decoding (BD).

1) When the number of EPDCCH candidates to be monitored by the MTC device is kept the same as that of the existing ones and an ECCE of a lowest index included in an EPDCCH candidate is included in a PRB resource location where the MTC device can not receive, the MTC device may exclude the corresponding EPDCCH candidate from blind decoding (BL). For example, When the number of EPDCCH candidates to be monitored by the MTC device is 4 and an ECCE of a lowest index included in EPDCCH candidate 2 is transmitted from a base station on a PRB resource location that the MTC device can not receive, the MTC device may monitor only EPDCCH candidate indexes 0, 1 and 3 except the EPDCCH candidate index 2 among EPDCCH candidate indexes 0, 1, 2, and 3.

2) The number of EPDCCH candidates to be monitored by the MTC device is as shown in the table above, but EPDCCH candidate(s) transmitted from the base station on a PRB resource location where a lowest index ECCE included in a EPDCCH candidate is not received by the MTC device may not be included in a EPDCCH candidate list to be monitored by the MTC. That is, for example, when the number of EPDCCH candidates to be monitored by the MTC device is 4 and an ECCE of a lowest index included in the EPDCCH candidate 2 is transmitted from the base station through a PRB resource location that the MTC device can not receive, the EPDCCH candidate 2 may be excluded from the EPDCCH candidate index to be monitored by the MTC. That is, the MTC device may monitor EPDCCH candidate indexes 0, 1, 3, and 4.

When considering these effects, a cost saving MTC device may support only an EPDCCH of distributed mapping. Alternatively, even when an EPDCCH of localized mapping is transmitted, the base station may also use RE mapping of an EPDCCH for the MTC device using a distributed mapping scheme.

Alternatively, when a distributed mapping scheme is used for the cost-reduced MTC device, the base station may apply RE mapping based on EPDCCH-PRB-set sizes of 8 PRBs. When a distributed mapping scheme is used, RE mapping may be performed based on EPDCCH-PRB-set sizes, and a

TABLE 2

| | The number of EPDCCH Candidates $M^{(L)}_p$ for Case 1 | | | | The number of EPDCCH Candidates $M^{(L)}_p$ for Case 2 | | | | The number of EPDCCH Candidates $M^{(L)}_p$ for Case 3 | | | |
|---|---|---|---|---|---|---|---|---|---|---|---|---|
| $N^{Xp}_{RB}$ | L = 2 | L = 4 | L = 8 | L = 16 | L = 1 | L = 2 | L = 4 | L = 8 | L = 1 | L = 2 | L = 4 | L = 8 |
| 1 | 2 | 1 | 1 | 0 | 2 | 1 | 1 | 0 | 4 | 2 | 1 | 1 |
| 3 | 6 | 3 | 2 | 1 | 6 | 3 | 2 | 1 | 6 | 6 | 2 | 2 |
| 6 | 6 | 6 | 2 | 2 | 6 | 6 | 2 | 2 | 6 | 6 | 2 | 2 | search space may be defined. That is, an EPDCCH candidate may be defined by only an ECCE existing within an EPDCCH-PRB-set of 6 PRBs.

As previously described, to support an EPDCCH-PRB-sets of 6 PRBs, the MTC device may perform the ECCE to RE mapping on the assumption of the existing an EPDCCH-PRB-set of 8 PRBs, when it is assumed that an EPDCCH is rate-matched (or punctured) with respect to a resource area (RE) that does not exist in 6 PRB regions that the MTC device can receive, in the case of EPDCCH transmission of distributed mapping, RE resources used for an actual EPDCCH transmission among RE resources included in the ECCE may be reduced by '(8PRB-6PRB)/8PRB=¼'.

Meanwhile, aggregation level (AL) of an EPDCCH to be monitored by the MTC device and the number of EPDCCH decoding candidates for each aggregation level (AL) may change according to a case (Case 1, Case 2, Case 3) which are determined as follows.

TABLE 3

1. Case 1 applies to the following cases.
When the DCI format 2/2A/2B/2C/2D is monitored and NDLRB ≥ 25, in the case of the normal subframes and the normal downlink cyclic prefix (CP),
When the DCI format 2/2A/2B/2C/2D is monitored, in the case of a normal downlink CP and in the case of a special subframe having special subframe settings 3, 4 and 8, or,
When the DCI format 1A/1B/1D/1/2A/2B/2C/2D/0/4 is monitored, when normal subframes and normal downlink CP, nEPDCCH < 104, or,
When DCI format 1A/1B/1D/1/2A/2/2B/2C/2D/0/4 is monitored, in the case of normal downlink CP when nEPDCCH < 4 and in the case of a special subframe having a special subframe setting of 3, 4, and 8.
Here, the nEPDCCH indicates the number of downlink resource elements (REs) in the PRB pair set for a possible EPDCCH transmission of the EPDCCH set.
2. Case 2 corresponds to the following cases.
When the DCI format 1A/1B/1D/1/2A/2/2B/2C/2D/0/4 is monitored, in the case of the normal sub-frame and extended CP,
When the DCI format 1A/1B/1D/1/2A/2/2B/2C/2D/0/4 is monitored, in the case of the normal subframes and extended normal downlink CP, or,
In the case of the normal downlink CP when the DCI format 1A/1B/1D/1/2A/2/2B/2C/2D/0/4 is monitored and in the case of special subframes having special subframe settings 1, 2, 6, 7, and 9,
When the DCI format 1A/1B/1D/1/2A/2/2B/2C/2D/0/4 is monitored, in the case of special subframes having special subframe settings 1, 2, 3, 5, and 6,
In the case of extended normal downlink CP when DCI format 1A/1B/1D/1/2A/2/2B/2C/2D/0/4 is monitored and in case of special subframes having special subframe settings 1, 2, 3, 5, and 6
3. Case 3 may apply to cases other than the cases (Case 1 and Case 2).

At this time, according to a value of nEPDCCH which means the number of REs that can be used for actual EPDCCH transmission per PRB, a case to be applied for monitoring an EPDCCH of the MTC device may change. More precisely, nEPDCCH is defined as follows.

TABLE 4

The nEPDCCH for a specific UE is defined by the number of downlink resource elements (k, 1) in the PRB pair set for the EPDCCH set $X_0$, and satisfies the following condition.
It is a part of any one among 16 EREGs within a PRB pair.
It is considered that it is not used by the UE for CRS.
It is considered that it is not used by the UE for CSI-RS.
Index 1 from the first slot in a subframe that satisfies '1 ≥ $l_{EPDCCHStart}$'.

In the past, since the number of REs that can be used for actual EPDCCH transmission is the same as that of REs for each PRB region used for the existing EPDCCH transmission, nEPDCCH may be defined as described above. However, to support an EPDCCH-PRB-set of 6 PRBs, the ECCE to RE mapping is performed assuming the conventional an EPDCCH-PRB-sets of 8 PRBs. When it is assumed that an EPDCCH in resource area (RE) that not exists in a region of 6 PRBs that the MTC device can receive is rate-matched (or punctured), the number of REs that can be used for actual EPDCCH transmission for each PRB region (among 8 PRB regions) may change. Thus, when a value of nEPDCCH is determined by the conventional definition, an amount of RE resources used for actual EPDCCH transmission may not be correctly applied to a value of nEPDCCH.

Accordingly, in this section, it is suggested that a value of nEPDCCH for the MTC device is determined as 'an amount of PRBs to which an actual EPDCCH can be transmitted within a EPDCCH-PRB-set'/'the number of PRBs assumed for ECCE to RE mapping'. That is, for example, to support an EPDCCH-PRB-set of 6 PRBs, when the ECCE to RE mapping is performed assuming an EPDCCH-PRB-set of the conventional 8 PRBs, 'the total number of REs in which an EPDCCH can be transmitted within 6 PRBs'/8 may be a value of nEPDCCH. This definition may also be applied to other general situations. For example, even if PSS/SSS/PBCH is transmitted within only some region (a partial region) of 6 PRBs, it may be more useful to define the value of nEPDCCH in 'an amount of PRBs that an actual EPDCCH can be transmitted within an EPDCCH-PRB-set'/'the number of PRBs assumed for ECCE to RE mapping'.

I-2. Second Method: New EPDCCH-PRB-Set Size Using the Existing EPDCCH Mapping

In this section, to support an EPDCCH-PRB-set of 1 PRB, 3 PRBs, and 6PRBs, the existing EREG to RE mapping and the ECCE to EREG mapping may be used as it is as much as possible. In this case, to support an EPDCCH-PRB-set of 1 PRB, 3 PRBs, and 6 PRBs, it is proposed to provide the ECCE to EREG mapping formula to be changed and aggregation level (AL) that can be supported in each EPDCCH-PRB-set size.

I-2-1. ECCE to EREG Mapping Formula

First, according to the existing technology, EREGs included in ECCE may be determined by the following equations.

TABLE 5

The ECCEs available for transmission of the EPDCCH in the EPDCCH set $S_m$ in subframe i are numbered from 0 to $N_{ECCE,m,i}-1$. The ECCE numbers are as follows:
When mapping for localized transmission, in PRB index $\lfloor n/N_{RB}^{ECCE} \rfloor$, the EREGs are numbered with $(n \bmod N_{RB}^{ECCE}) + jN_{RB}^{ECCE}$.
When mapping for distributed transmission, in PRB index $(n + j \max(1, N_{RB}^{S_m}/N_{ECCE}^{EREG})) \bmod N_{RB}^{S_m}$, the EREGs are numbered with $\lfloor n/N_{RB}^{S_m} \rfloor + jN_{RB}^{ECCE}$.
$j = 0, 1, \ldots, N_{ECCE}^{EREG}-1$, and $N_{ECCE}^{EREG}$ is the number of EREGs per ECCE. Moreover, $N_{RB}^{ECCE} = 16/N_{ECCE}^{EREG}$ is the number of ECCEs per a resource block pair.
The pair of resource blocks constituting the EPDCCH set $S_m$ are numbered from 0 to $N_{RB}^{S_m}-1$ in ascending order.

In the case of distributed mapping, when the existing contents described above are applied to an EPDCCH-PRB-set of 6 PRB sizes, when the value of $N_{ECCE}^{EREG}$ is 4, $N_{RB}^{S_m}/N_{ECCE}^{EREG}$ in the above formula may not be an integer.

Thus, in this section, it is suggested that the floor operation is taken for $N_{RB}^{S_m}/N_{ECCE}^{EREG}$ in the above formula, so that it is changed to $\lfloor N_{RB}^{S_m}/N_{ECCE}^{EREG} \rfloor$, or
a cell operation is taken and changed to $\lceil N_{RB}^{S_m}/N_{ECCE}^{EREG} \rceil$.

Alternatively, it is suggested that a $N_{RB}^{S_m}/N_{ECCE}^{EREG}$ portion of the above formula should be changed to $N_{RB}^{S_m}/2$. These changes may be applied only when the EPDCCH-PRB-set size is 6 PRBs.

Alternatively, after selecting A (e. g., A=2) EREGs in the same PRB region for distributed mapping, A EREGs may be selected from $A*N^{Sm}_{RB}/N^{EREG}_{ECCE}$ times PRBs. In this case, characteristically, a value of A is set to 2 in the case of the EPDCCH-PRB-set of 6 PRBs, and in the case of EPDCCH-PRB-set of 2 PRBs and EPDCCH-PRB-set of 4 PRBs, a value of A may be set to 1.

TABLE 6

The ECCEs available for the EPDCCH transmission within the EPDCCH set $X_m$, in subframe i are numbered from 0 to $N_{ECCE,m,i}-1$. The ECCE numbers are as follows.
When mapping for localized transmission, in the PRB index $\lfloor n/N_{RB}^{ECCE} \rfloor$, the EREGs are numbered with (n mod $N_{RB}^{ECCE}$) + $jN_{RB}^{ECCE}$.
When mapping for distributed transmission, in the PRB index $(n + \lfloor j/A \rfloor max(1,A*N_{RB}^{Xm}/N_{EREG}^{ECCE})) mod\ N_{RB}^{Xm}$, the EREGs are numbered with $\lfloor n/N_{RB}^{Xm} \rfloor + jN_{RB}^{ECCE}$
$J = 0, 1, \ldots, N^{EREG}_{ECCE}-1$, and $N^{EREG}_{ECCE}$ is the number of EREGs per ECCE. Moreover, $N^{ECCE}_{RB} = 16/N^{EREG}_{ECCE}$ is the number of ECCEs per a resource block pair.
The of resource block pairs constituting the EPDCCH set $S_m$ are numbered from 0 to $N^{Sm}_{RB}-1$ in ascending order.

I-2-2. Supportable Aggregation Level (AL) and Blind Decoding (BL) Table

For an MTC device in which a minimum PRB size to which EPDCCH can be transmitted is 6 PRBs, a PRB size of 6 PRBs, along with 6 PRBs, may be a EPDCCH-PRB-set size (here, 6 is a divisor). That is, an EPDCCH-PRB-set of all or some of 1 PRB, 2 PRB, 3 PRB and 6 PRB sizes may be supported. In general, since 1 PRB includes 4 ECCEs (in a normal sub-frame to which a normal CP is applied), when an EPDCCH-PRB-set of 6 PRBs is supported, 32 aggregation levels (AL) may be not supported in the corresponding EPDCCH-PRB-set. Meanwhile, since 6 PRBs include a maximum of 24 ECCEs, it may be desirable to support 24 aggregation levels (AL) in the EPDCCH-PRB-sets of 6 PRBs to effectively use resources of 6 PRBs. Likewise, in the case of an EPDCCH-PRB-set having 3 PRBs, since 3 PRBs include a maximum of 12 ECCEs. To effectively use 3 PRB resources, it may be desirable to support 12 aggregation levels (ALs).

In the present invention, it proposes to provide the number of EPDCCH candidates that the MTC device should monitor according to aggregation level (AL) supported in an EPDCCH-PRB-set of 1 PRB, 2 PRBs, 3 PRBs, and 6PRBs.

I-2-2-1. Option 1

To minimize changes of the existing technology, only aggregation level (AL) which is currently supported may be supported by an EPDCCH-PRB-set of 1 PRB, 2 PRBs, 3 PRBs, and 6 PRBs. That is, when a EPDCCH-PRB-set size is 6 PRBs, aggregation level (AL) may support only 1, 2, 4, 8, and 16. At this time, the supported aggregation level (AL) may be limited to some sets (partial sets) based on a case. For example, in the case of EPDCCH of distributed mapping, in the case of Case 1, only aggregation levels 2, 4, 8, and 16 may be supported. In the case of Case 2, only aggregation levels 1, 2, 4, 8, and 16 may be supported. In the case of Case 3, only aggregation levels 1, 2, 4, 8, and 16 may be supported. In the EPDCCH of the localized mapping, in the case of Case 1, only aggregation levels 2, 4, 8, and 16 may be supported. In the case of Case 2, only aggregation levels 1, 2, 4, and 8 may be supported. In the case of Case 3, only aggregation levels 1, 2, 4, and 8 may be supported.

Specifically, when the number of maximum blind decoding (BD) that can be used for EPDCCH is 16, aggregation level (AL) supported by a size of the EPDCCH-PRB-set and the number (the number of blind decoding (BD) based on the aggregation level) of EPDCCH candidates that the MTC device should monitor based on the aggregation level (AL) may be the same as shown in Tables 7 and 8 below. In this case, since 2 PRB EPDCCH-PRB-sets are PRB sizes which are currently supported, the existing table may be used as it is.

Table 7 below is for the distributed mapping in Case 1, Case 2, Case 3.

TABLE 7

| | The number of EPDCCH Candidates $M^{(L)}_p$ for Case 1 | | | | | The number of EPDCCH Candidates $M^{(L)}_p$ for Case 2 | | | | | The number of EPDCCH Candidates $M^{(L)}_p$ for Case 3 | | | | |
|---|---|---|---|---|---|---|---|---|---|---|---|---|---|---|---|
| $N^{Xp}_{RB}$ | L = 2 | L = 4 | L = 8 | L = 16 | L = 32 | L = 1 | L = 2 | L = 4 | L = 8 | L = 16 | L = 1 | L = 2 | L = 4 | L = 8 | L = 16 |
| 6 | 6 | 6 | 3 | 1 | 0 | 6 | 6 | 3 | 1 | 0 | 4 | 4 | 4 | 3 | 1 |
| 3 | 6 | 3 | 1 | 0 | 0 | 6 | 3 | 1 | 0 | 0 | 6 | 6 | 3 | 1 | 0 |
| 1 | 2 | 1 | 0 | 0 | 0 | 2 | 1 | 0 | 0 | 0 | 4 | 2 | 1 | 0 | 0 |

Table 8 below is for localized mapping in Case 1, Case 2, Case 3.

TABLE 8

| | The number of EPDCCH Candidates $M^{(L)}p$ for Case 1 | | | | The number of EPDCCH Candidates $M^{(L)}p$ for Case 2 | | | | The number of EPDCCH Candidates $M^{(L)}p$ for Case 3 | | | |
|---|---|---|---|---|---|---|---|---|---|---|---|---|
| $N^{Xp}_{RB}$ | L = 2 | L = 4 | L = 8 | L = 16 | L = 1 | L = 2 | L = 4 | L = 8 | L = 1 | L = 2 | L = 4 | L = 8 |
| 6 | 6 | 6 | 3 | 1 | 6 | 6 | 3 | 1 | 6 | 6 | 2 | 2 |
| 3 | 6 | 3 | 1 | 0 | 6 | 3 | 1 | 0 | 6 | 6 | 3 | 1 |
| 1 | 2 | 1 | 0 | 0 | 2 | 1 | 0 | 0 | 4 | 2 | 1 | 0 |

I-2-2-2. Option 2

To minimize changes of the existing technology, aggregation level (AL) which are currently supported may be also supported by the EPDCCH-PRB-set of 1 PRB, 2 PRBs, 3 PRBs, and 6 PRBs, EPDCCH-PRB-set, and thus it may additionally support a maximum aggregation level (AL) that can be supported in each EPDCCH-PRB-set size to effectively use resources. For example, since 6 PRBs include a maximum of 24 ECCEs, it may be desirable to support 24 aggregation levels in the EPDCCH-PRB-set of 6 PRBs to effectively use resources of 6 PRBs. In addition, since 3 PRBs contain up to 24 ECCEs, it may be desirable to support 12 aggregation levels in an EPDCCH-PRB-set of 3 PRBs to effectively use resources of 3 PRBs. That is, when an EPDCCH-PRB-set size is 6 PRBs, aggregation level (AL) may support 1, 2, 4, 8, 16, and 24. At this time, the supported aggregation level (AL) may be limited to a partial set based on a case. For example, in the case of an EPDCCH of distributed mapping, aggregation levels (ALs) 2, 4, 8, 16, and 24 may be supported in Case 1. Only aggregation levels 1, 2, 4, 8 may be supported in Case 2. Aggregation levels 1, 2, 4, 8, and 16 may be supported in Case 3. For example, in the EPDCCH of the localized mapping, in the case of Case 1, only aggregation levels 2, 4, 8, and 16 may be supported. In the case of Case 2, only aggregation levels 1, 2, 4, and 8 may be supported. In the case of Case 3, only aggregation levels 1, 2, 4, and 8 may be supported.

In this case, when the maximum number of blind decoding (BD) usable for EPDCCH is 16, aggregation level (AL) supported by a size of an EPDCCH-PRB-set and the number (the number of blind decoding (BD) based on AL) of EPDCCH candidates that the MTC device should monitor based on AL may be the same as shown in Tables 6 and 7 above. In this case, since 2 PRB EPDCCH-PRB-sets are PRB sizes which are currently supported, the existing table may be used as it is.

Table 9 below shows the distributed mapping scheme in Case 1, Case 2 and Case 3.

TABLE 9

| $N^{Xp}_{RB}$ | The number of EPDCCH Candidates $M^{(L)}_p$ for Case 1 | | | | | The number of EPDCCH Candidates $M^{(L)}_p$ for Case 2 | | | | | The number of EPDCCH Candidates $M^{(L)}_p$ for Case 3 | | | | |
|---|---|---|---|---|---|---|---|---|---|---|---|---|---|---|---|
| | L=2 | L=4 | L=8 | L=16 | L=24 | L=1 | L=2 | L=4 | L=8 | L=16 | L=1 | L=2 | L=4 | L=8 | L=16 |
| 6 | 5 | 5 | 4 | 1 | 1 | 6 | 6 | 3 | 1 | 0 | 4 | 4 | 4 | 3 | 1 |
| | 4 | 6 | | | | | | | | | | | | | |
| | 6 | 4 | | | | | | | | | | | | | |

Table 10 below shows the localized mapping scheme in Case 1, Case 2, Case 3.

TABLE 10

| $N^{Xp}_{RB}$ | The number of EPDCCH Candidates $M^{(L)}p$ for Case 1 | | | | The number of EPDCCH Candidates $M^{(L)}p$ for Case 2 | | | | The number of EPDCCH Candidates $M^{(L)}p$ for Case 3 | | | |
|---|---|---|---|---|---|---|---|---|---|---|---|---|
| | L=2 | L=4 | L=8 | L=16 | L=1 | L=2 | L=4 | L=8 | L=1 | L=2 | L=4 | L=8 |
| 6 | 6 | 6 | 3 | 1 | 6 | 6 | 3 | 1 | 6 | 6 | 2 | 2 |

Table 11 below shows the number of EPDCCH candidates to be monitored by the MTC device when the distributed mapping scheme is used in Case 1, Case 2, and Case 3.

TABLE 11

| $N^{Xp}_{RB}$ | The number of EPDCCH Candidates $M^{(L)}_p$ for Case 1 | | | | | The number of EPDCCH Candidates $M^{(L)}_p$ for Case 2 | | | | | The number of EPDCCH Candidates $M^{(L)}_p$ for Case 3 | | | | |
|---|---|---|---|---|---|---|---|---|---|---|---|---|---|---|---|
| | L=2 | L=4 | L=8 | L=12 | | L=1 | L=2 | L=4 | L=8 | L=12 | L=1 | L=2 | L=4 | L=8 | L=12 |
| 3 | 6 | 3 | 1 | 1 | | 6 | 3 | 1 | 0 | 0 | 5 | 6 | 3 | 1 | 1 |

Table 12 below shows the number of EPDCCH candidates to be monitored by the MTC device when the localized mapping scheme is used in Case 1, Case 2, and Case 3.

TABLE 12

| $N^{Xp}_{RB}$ | The number of EPDCCH Candidates $M^{(L)}p$ for Case 1 | | | | | The number of EPDCCH Candidates $M^{(L)}p$ for Case 2 | | | | The number of EPDCCH Candidates $M^{(L)}p$ for Case 3 | | | |
|---|---|---|---|---|---|---|---|---|---|---|---|---|---|
| | L=2 | L=4 | L=8 | L=12 | | L=1 | L=2 | L=4 | L=8 | L=1 | L=2 | L=4 | L=8 |
| 3 | 6 | 3 | 1 | 1 | | 6 | 3 | 1 | 0 | 6 | 6 | 3 | 1 |

At this time, in the case of Case 2, since one ECCE includes 8 EREGs, 6 PRBs may include a maximum of 12 ECCEs. Thus, in the case of Case 2, it may be desirable to support 12 aggregation levels in the EPDCCH-PRB-set of 6 PRBs to effectively use resources of the 6 PRBs. That is, when an EPDCCH-PRB-set size is 6 PRBs, it may be desirable to support aggregation levels 1, 2, 4 and 12 in Case 2 as shown in Tables 13 below. In Case 2, it may be desirable to support 6 aggregation levels in an EPDCCH-PRB-set of 3 PRBs. Thus, in the case of the EPDCCH-PRB-set of 3 PRBs, it is possible to support aggregation levels 1, 2, 4, and 6 in Case 2 as shown in Tables 14 below.

In this case, when the number of maximum blind decoding (BD) that can be used for EPDCCH is 16, aggregation level (AL) supported by a size of an EPDCCH-PRB-set and the number of EPDCCH candidates to be monitored by the MTC device based on AL may be as shown in Tables 13 and 14 below.

Table 13 below shows the number of EPDCCH candidates to be monitored by the MTC device when the distributed mapping scheme is used in Case 2.

TABLE 13

| $N^{Xp}_{RB}$ | The number of EPDCCH Candidates $M^{(L)}_p$ for Case 2 | | | | |
|---|---|---|---|---|---|
|  | L = 1 | L = 2 | L = 4 | L = 8 | L = 12 |
| 6 | 5 | 6 | 3 | 1 | 1 |

Table 14 below shows the number of EPDCCH candidates to be monitored by the MTC device when the distributed mapping scheme is used in Case 2.

TABLE 14

| $N^{Xp}_{RB}$ | The number of EPDCCH Candidates $M^{(L)}_p$ for Case 2 | | | |
|---|---|---|---|---|
|  | L = 1 | L = 2 | L = 4 | L = 6 |
| 3 | 6 | 3 | 1 | 1 |

I-2-2-3. Option 3

Maximum aggregation level (AL) that can be supported by a size of the EPDCCH-PRB-set of 1, 3, and 6 PRBs may be supported, while the aggregation levels 24 and 12 may be commonly supported to commonly support the aggregation level (AL) supported by the EPDCCH-PRB-set of 1, 3, and 6 PRBs regardless of the size of the EPDCCH-PRB-set. In addition, to support aggregation levels (ALs) that exhibit relatively uniform performance differences, all or some of the 1, 2, 4, 6, 12, and 24 aggregation levels (ALs) may be supported by EPDCCH for a cost-saving MTC device.

In this case, when the number of maximum blind decoding (BD) that can be used for the EPDCCH is 16, aggregation level (AL) supported by the size of the EPDCCH-PRB-set and the number of EPDCCH candidates to be monitored by the MTC device based on AL may be as shown in Tables 15 and 16 below.

Table 15 below shows the number of EPDCCH candidates to be monitored by the MTC device when a distributed mapping scheme is used in Case 1, Case 2, and Case 3.

TABLE 15

| $N^{Xp}_{RB}$ | The number of EPDCCH Candidates $M^{(L)}_p$ for Case 1 | | | | | The number of EPDCCH Candidates $M^{(L)}_p$ for Case 2 | | | | | The number of EPDCCH Candidates $M^{(L)}_p$ for Case 3 | | | | |
|---|---|---|---|---|---|---|---|---|---|---|---|---|---|---|---|
|  | L = 2 | L = 4 | L = 6 | L = 12 | L = 24 | L = 1 | L = 2 | L = 4 | L = 6 | L = 12 | L = 1 | L = 2 | L = 4 | L = 6 | L = 12 |
| 6 | 6 | 4 | 3 | 2 | 1 | 6 | 4 | 3 | 2 | 1 | 4 | 4 | 4 | 2 | 2 |
| 3 | 6 | 3 | 2 | 1 | 0 | 6 | 3 | 1 | 1 | 0 | 4 | 6 | 3 | 2 | 1 |
|  |  |  |  |  |  |  |  |  |  |  | 4 |  |  |  |  |
|  |  |  |  |  |  |  |  |  |  |  | 5 | 5 |  |  |  |
|  |  |  |  |  |  |  |  |  |  |  | 6 | 4 |  |  |  |
| 2 | 4 | 2 | 1 | 0 | 0 | 4 | 2 | 1 | 0 | 0 | 8 | 4 | 2 | 1 | 0 |
| 1 | 2 | 1 | 0 | 0 | 0 | 2 | 1 | 0 | 0 | 0 | 4 | 2 | 1 | 0 | 0 |

Table 16 below shows the number of EPDCCH candidates to be monitored by the MTC device when the localized mapping scheme is used in Case 1, Case 2, and Case 3.

TABLE 16

| $N^{Xp}_{RB}$ | The number of EPDCCH Candidates $M^{(L)}_p$ for Case 1 | | | | | The number of EPDCCH Candidates $M^{(L)}_p$ for Case 2 | | | | | The number of EPDCCH Candidates $M^{(L)}_p$ for Case 3 | | | |
|---|---|---|---|---|---|---|---|---|---|---|---|---|---|---|
|  | L = 2 | L = 4 | L = 6 | L = 12 | L = 1 | L = 2 | L = 4 | L = 6 | L = 1 | L = 2 | L = 4 | L = 6 | | |
| 6 | 6 | 6 | 2 | 2 | 6 | 6 | 2 | 2 | 6 | 6 | 2 | 2 |
| 3 | 6 | 3 | 2 | 1 | 6 | 3 | 1 | 1 | 6 | 6 | 2 | 2 |
| 2 | 4 | 2 | 1 | 0 | 4 | 2 | 1 | 0 | 8 | 4 | 2 | 1 |
| 1 | 2 | 1 | 0 | 0 | 2 | 1 | 0 | 0 | 4 | 2 | 1 | 0 |

Alternatively, all or some of the 1, 2, 3, 6, 12, and 24 aggregation levels (ALs) may be supported by the EPDCCH for cost-saving MTC devices to support aggregation levels (ALs) that exhibit relatively uniform performance differences.

In this case, when the number of maximum blind decoding (BD) usable for EPDCCH is 16, aggregation level (AL) supported by a size of the EPDCCH-PRB-set and the number of EPDCCH candidates to be monitored by the MTC device based on the AL may be the same as shown in Tables 17 and 18 below.

Table 17 below shows the number of EPDCCH candidates to be monitored by the MTC device when the distributed mapping scheme is used in Case 1, Case 2, and Case 3.

TABLE 17

| | The number of EPDCCH Candidates $M^{(L)}_p$ for Case 1 | | | | | The number of EPDCCH Candidates $M^{(L)}_p$ for Case 2 | | | | | The number of EPDCCH Candidates $M^{(L)}_p$ for Case 3 | | | | |
|---|---|---|---|---|---|---|---|---|---|---|---|---|---|---|---|
| $N^{Xp}_{RB}$ | L = 2 | L = 3 | L = 6 | L = 12 | L = 24 | L = 1 | L = 2 | L = 3 | L = 6 | L = 12 | L = 1 | L = 2 | L = 3 | L = 6 | L = 12 |
| 6 | 6 | 4 | 3 | 2 | 1 | 6 | 4 | 3 | 2 | 1 | 4 | 4 | 4 | 2 | 2 |
| 3 | 6 | 4 | 2 | 1 | 0 | 6 | 3 | 2 | 1 | 0 | 4 | 5 | 4 | 2 | 1 |
| 2 | 4 | 2 | 1 | 0 | 0 | 4 | 2 | 1 | 0 | 0 | 8 | 4 | 2 | 1 | 0 |
| 1 | 2 | 1 | 0 | 0 | 0 | 2 | 1 | 0 | 0 | 0 | 4 | 2 | 1 | 0 | 0 |

Table 18 below shows the number of EPDCCH candidates to be monitored by the MTC device when the localized mapping scheme is used in Case 1, Case 2, and Case 3.

TABLE 18

| | The number of EPDCCH Candidates $M^{(L)}_p$ for Case 1 | | | | The number of EPDCCH Candidates $M^{(L)}_p$ for Case 2 | | | | The number of EPDCCH Candidates $M^{(L)}_p$ for Case 3 | | | |
|---|---|---|---|---|---|---|---|---|---|---|---|---|
| $N^{Xp}_{RB}$ | L = 2 | L = 3 | L = 6 | L = 12 | L = 1 | L = 2 | L = 3 | L = 6 | L = 1 | L = 2 | L = 3 | L = 6 |
| 6 | 6 | 6 | 2 | 2 | 6 | 6 | 2 | 2 | 6 | 6 | 2 | 2 |
| 3 | 6 | 4 | 2 | 1 | 6 | 3 | 2 | 1 | 6 | 6 | 2 | 2 |
| 2 | 4 | 2 | 1 | 0 | 4 | 2 | 1 | 0 | 8 | 4 | 2 | 1 |
| 1 | 2 | 1 | 0 | 0 | 2 | 1 | 0 | 0 | 4 | 2 | 1 | 0 |

Meanwhile, the maximum aggregation level that can be supported by the size of the EPDCCH-PRB-set of 1, 2, 3, and 6 PRBs may be supported, while aggregation levels (ALs) 24, 12, 8 and 4 may be commonly supported to commonly support the aggregation levels supported by the EPDCCH-PRB-set of 1, 2, 3, and 6 PRBs regardless of a size of the EPDCCH-PRB-set. In addition, to support aggregation levels (ALs) that exhibit relatively uniform performance differences, all or some of 1, 2, 4, 8, 12, and 24 aggregation levels may be supported by EPDCCH for a cost-saving MTC device.

In this case, when the number of maximum blind decoding (BD) that can be used for EPDCCH is 16, aggregation level (AL) supported by a size of the EPDCCH-PRB-set and the number of EPDCCH candidates to be monitored by the MTC device based on the AL may be the same as shown in Tables 19 and 20 below.

Table 19 below shows the number of EPDCCH candidates to be monitored by the MTC device when the distributed mapping scheme is used in Case 1, Case 2, and Case 3.

TABLE 19

| | The number of EPDCCH Candidates $M^{(L)}_p$ for Case 1 | | | | | The number of EPDCCH Candidates $M^{(L)}_p$ for Case 2 | | | | | The number of EPDCCH Candidates $M^{(L)}_p$ for Case 3 | | | | |
|---|---|---|---|---|---|---|---|---|---|---|---|---|---|---|---|
| $N^{Xp}_{RB}$ | L = 2 | L = 4 | L = 8 | L = 12 | L = 24 | L = 1 | L = 2 | L = 4 | L = 8 | L = 12 | L = 1 | L = 2 | L = 4 | L = 8 | L = 12 |
| 6 | 4 | 6 | 3 | 2 | 1 | 5 | 6 | 3 | 1 | 1 | 4 | 4 | 4 | 3 | 2 |
|   | 5 | 5 |   |   |   | (6) | (5) |   |   |   |   |   |   |   |   |
|   | 6 | 4 |   |   |   |   |   |   |   |   |   |   |   |   |   |
| 3 | 6 | 3 | 1 | 1 | 0 | 6 | 3 | 1 | 0 | 0 | 5 | 6 | 3 | 1 | 1 |
|   |   |   |   |   |   |   |   |   |   |   | 6 | 5 |   |   |   |

TABLE 19-continued

| | The number of EPDCCH Candidates $M^{(L)}_p$ for Case 1 | | | | | The number of EPDCCH Candidates $M^{(L)}_p$ for Case 2 | | | | | The number of EPDCCH Candidates $M^{(L)}_p$ for Case 3 | | | | |
|---|---|---|---|---|---|---|---|---|---|---|---|---|---|---|---|
| $N^{Xp}_{RB}$ | L=2 | L=4 | L=8 | L=12 | L=24 | L=1 | L=2 | L=4 | L=8 | L=12 | L=1 | L=2 | L=4 | L=8 | L=12 |
| 2 | 4 | 2 | 1 | 0 | 0 | 4 | 2 | 1 | 0 | 0 | 8 | 4 | 2 | 1 | 0 |
| 1 | 2 | 1 | 0 | 0 | 0 | 2 | 1 | 0 | 0 | 0 | 4 | 2 | 1 | 0 | 0 |

Table 20 below shows the number of EPDCCH candidates to be monitored by the MTC device when the localized mapping scheme is used in Case 1, Case 2, and Case 3.

TABLE 20

| | The number of EPDCCH Candidates $M^{(L)}_p$ for Case 1 | | | | The number of EPDCCH Candidates $M^{(L)}_p$ for Case 2 | | | | The number of EPDCCH Candidates $M^{(L)}_p$ for Case 3 | | | |
|---|---|---|---|---|---|---|---|---|---|---|---|---|
| $N^{Xp}_{RB}$ | L=2 | L=4 | L=8 | L=12 | L=1 | L=2 | L=4 | L=8 | L=1 | L=2 | L=4 | L=8 |
| 6 | 6 | 6 | 3 | 2 | 6 | 6 | 3 | 1 | 6 | 6 | 2 | 2 |
|   | 5 | 6 |   |   |   |   |   |   |   |   |   |   |
| 3 | 6 | 3 | 1 | 1 | 6 | 3 | 1 | 0 | 6 | 6 | 3 | 1 |
| 2 | 4 | 2 | 1 | 0 | 4 | 2 | 1 | 0 | 8 | 4 | 2 | 1 |
| 1 | 2 | 1 | 0 | 0 | 2 | 1 | 0 | 0 | 4 | 2 | 1 | 0 |

I-3. Third Method: New EPDCCH-PRB-Set Size Using New EPDCCH Mapping

For a cost-saving MTC device having a maximum PRB size of 6 PRBs in which an EPDCCH can be transmitted, a PRB size of 6 PRBs, along with 6 PRBs, may be a size of the EPDCCH-PRB-set (here, 6 is a divisor). That is, an EPDCCH-PRB-set of all or some of 1 PRB, 2 PRB, 3 PRB and 6 PRB sizes may be supported. Especially, when an EPDCCH-PRB-set of 1 PRB, 3 PRBs, and 6 PRBs is supported, the number of EREGs included in an ECCE is 4. A maximum of 4 ECCEs may exist in one PRB. Conventional EPDCCH mapping scheme supporting aggregation levels (ALs) of n squared sizes of 2 may be unsuitable.

In the present invention, it is proposed to provide new EREG to RE mapping, ECCE to EREG mapping, and aggregation level which are suitable for EPDCCH-PRB-sets of 1 PRB, 3 PRBs, and 6 PRBs size.

I-3-1. EPDCCH RE Mapping Scheme 1

In this section, it is proposed that one EREG contains 12 REs. In this case, 12 EREGs exist in one PRB. At this time, the EREG to RE mapping in the PRB may be the same as shown in, for example, FIGS. 15A and 15B.

Figure 15A:
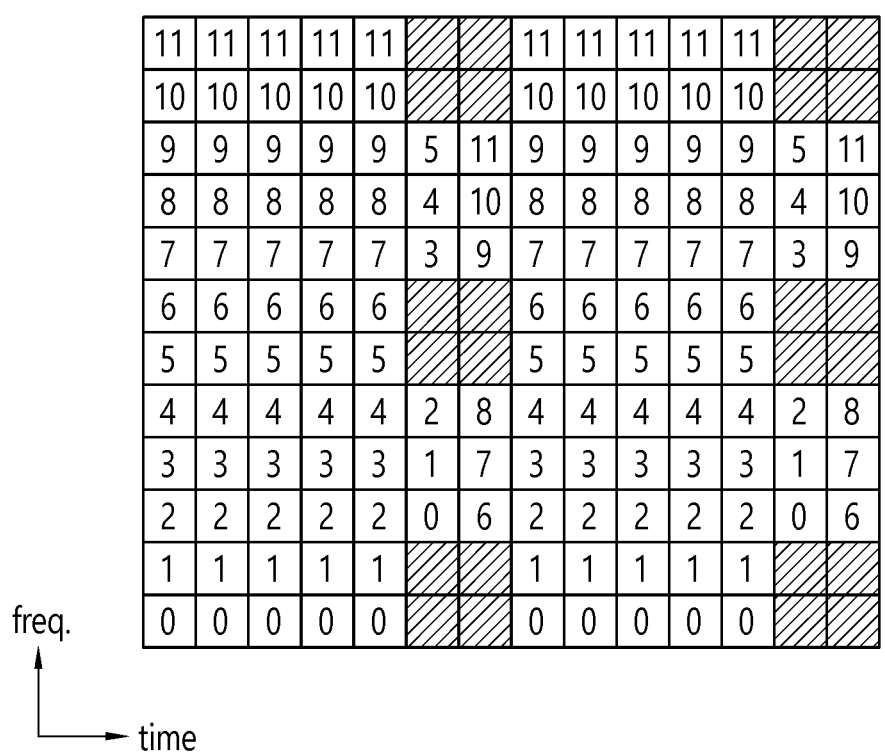
FIGS. 15A and 15B illustrate examples of EREG to RE mapping according to an embodiment of a third method of the present specification.
Figure 15B:
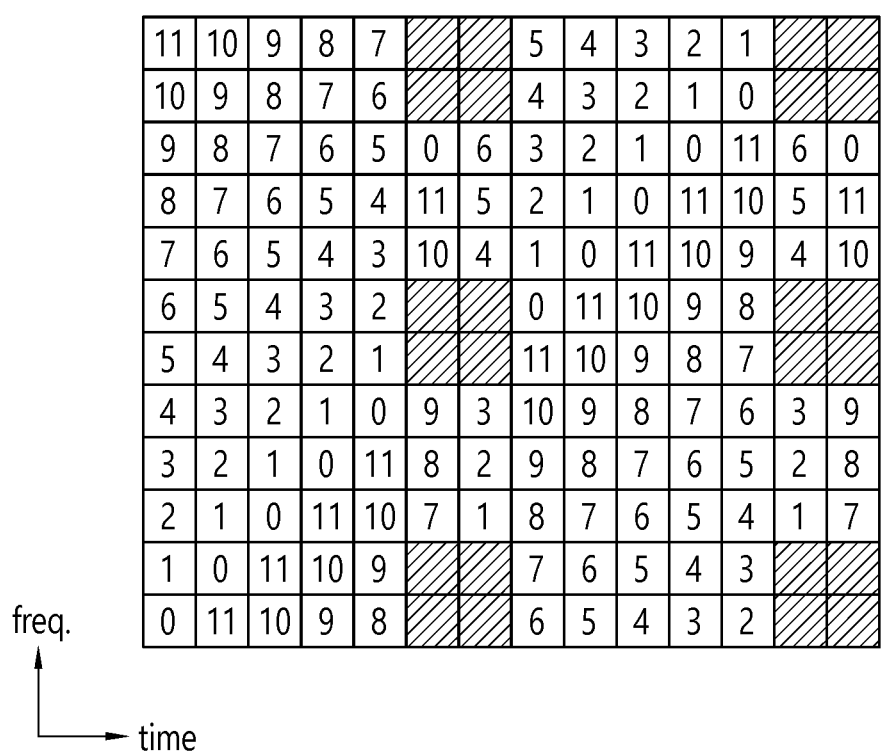

FIGS. 15A and 15B illustrate examples of EREG to RE mapping according to an embodiment of a third method of the present specification.

In FIGS. 15A and 15B, REs marked with the same number may be REs included in the same EREG. In the EREG to RE mapping scheme illustrated in FIG. 15A, REs included in the same EREG are substantially located on the same subcarriers. In this case, when EPDCCH transmission is rate-matched with transmission of CRS, CSI-RS, or the like, there may be a problem that resource which can not be used for the EPDCCH transmission occurs only in a specific EREG. On the other hand, in the EREG to RE mapping scheme shown in FIG. 15B, locations of REs included in the EREG may be cyclic shifted (e.g., v-shift) or frequency hopped on an OFDM symbol basis.

Hereinafter, various options for how many EREGs are included in one ECCE will be described.

I-3-1-1. Option 1

According to the first option, one ECCE may include 3 EREGs. In this case, one ECCE may contain 36 (=3×12) REs. A maximum of 4 ECCEs may exist in one PRB.

In addition, since the number of ECCEs included in one PRB is the same as that of the existing EPDCCH, supportable aggregation level (AL) and blind decoding (BD) based on the AL may be the same as described above.

I-3-1-2. Option 2

According to the second option, one ECCE may include 4 EREGs. In this case, one ECCE includes 48 (=4×12) REs. A maximum of 3 ECCEs may exist in one PRB.

In this case, EREGs included in ECCE may be determined by modifying the existing equation described in Section 1-2-1. That is, a floor operation is taken for $N^{Sm}_{RB}/N^{EREG}_{ECCE}$ in the existing equation described in Section 1-2-1, and thus it may be changed to $\lfloor N^{Sm}_{RB}/N^{EREG}_{ECCE} \rfloor$, or a ceil operation may be taken and changed to $\lceil N^{Sm}_{RB}/N^{EREG}_{ECCE} \rceil$.

At this time, the number of ECCEs constituting one PRB is 3 different from the conventional one. Thus, an EPDCC-PRB-set of 1 PRB, 2 PRBs, 3 PRBs, and 6 PRBs may include 3, 6, 9, and 18 ECCEs, respectively. Thus, suitable aggregation levels are may be 1, 3, 6, 9, 18, and the like.

To support aggregation levels (ALs) that exhibit relatively uniform performance differences, 1, 3, 6, 9, and 18 aggregation levels (ALs) may be supported. In this case, when the number of maximum blind decoding (BD) usable for EPDCCH is 16, aggregation level (AL) supported by a size of the EPDCCH-PRB-set and the number of EPDCCH candidates to be monitored by the MTC device based on the AL may be the same as shown in the following table.

TABLE 21

| | Number of EPDCCH candidates $M^{(L)}_p$ | | | | |
|---|---|---|---|---|---|
| $N^{Xp}_{RB}$ | L=1 | L=3 | L=6 | L=9 | L=18 |
| 6 | 4 | 6 | 3 | 2 | 1 |
|   | 5 | 5 |   |   |   |
|   | 6 | 4 |   |   |   |
| 3 | 9 | 3 | 1 | 1 | 0 |
| 2 | 6 | 2 | 1 | 0 | 0 |
| 1 | 3 | 1 | 0 | 0 | 0 |

Meanwhile, when considering that the EPDCCH-PRB-set of 2 PRB sizes is not supported, it may be possible to support 1, 3, 9, and 18 aggregation levels. In this case, when the number of maximum blind decoding (BD) that can be used for EPDCCH is 16, aggregation level (AL) supported by the size of the EPDCCH-PRB-set and the number of EPDCCH candidates to be monitored by the MTC device based on the AL may be the same as shown in the following Table 22.

TABLE 22

| $N^{Xp}_{RB}$ | The number of EPDCCH Candidates $M^{(L)}_p$ for Case 1 | | | |
|---|---|---|---|---|
|  | L = 1 | L = 3 | L = 9 | L = 18 |
| 6 | 7 | 6 | 2 | 1 |
| 3 | 9 | 3 | 1 | 0 |
| 2 | 6 | 2 | 0 | 0 |
| 1 | 3 | 1 | 0 | 0 |

Since a cost-reduced MTC device operates in a reduced band (i.e., 6 PRBs) instead of an entire system band of a cell, frequency diversity gain between the distributed mapping scheme and the localized mapping scheme of the EPDCCH may not be large. Thus, an MTC device operating in the reduced band (e.g., 6 PRBs) may support only the localized mapping scheme.

I-3-2. EPDCCH RE Mapping Scheme 2

In this section, it is proposed that 8 EREGs are included in one PRB. In this case, in the case of normal CP, 18 REs may be included in one EREG and 16 REs are included in one EREG in the case of extended CP. That is, there may be eight (0 to 7) EREGs per a PRB pair. All REs within the PRB pair except REs used to transmit DM-RS for antenna port p={107, 108, 109, 110} for the normal CP or the antenna port p={107, 108} may be first mapped in ascending order from 0 to 7 on the frequency axis, and then mapped in time order. All REs having a number i in the PRB pair may be included in the i-th EREG.

At this time, in the case of the normal CP, one ECCE may include 2 EREGs. In addition, in the case of the extended CP, one ECCE may also include 2 EREGs.

At this time, EREGs included in the ECCE may be determined in the same way as the existing equation described in Section 1-2-1.

In this case, it is proposed that one ECCE includes 2 EREGs as in a normal downlink subframe in all special subframes, regardless of special subframe setting.

In this case, EPDCCH for the MTC device may belong to only Case 1 and Case 3 as shown below.

TABLE 23

1. Case 1 applies to the following cases.
When the DCI format 2/2A/2B/2C/2D is monitored and $N^{DL}_{RB} \geq 25$, in the case of normal subframes and the normal downlink cyclic prefix (CP),
When the DCI format 1A/1B/1D/1/2/2A/2B/2C/2D/0/4 is monitored, when normal subframes and the normal downlink CP, $n_{EPDCCH} < 104$, or,
3. Case 3 may apply to cases other than the case (Case 1).

In this case, since the number of ECCEs that can exist in an EPDCCH-PRB-set of the same size is the same as that of the existing EPDCCH, supportable aggregation level (AL) and a blind decoding table related to the number of EPDCCH candidates to be supported by the MTC device base on the AL may be the same as described in Option 2 of Section 1-3-1.2 above.

II. Basic Setting for Cost Saving MTC Machine

Among MTC devices, especially, in the case of a MTC device requiring coverage extension, (E) PDCCH and/or PDSCH may be repeatedly transmitted through a plurality of subframes. In this case, that a large amount of RRC signals are transmitted to the MTC device may have a large overhead. Accordingly, it is required to reduce an amount of unnecessary RRC signals as possible, and it may be also required to minimize configuration information through an RRC signal for informing the EPDCCH-PRB-set.

To this end, in this section, even if the MTC device does not receive configuration information through a specific RRC signal, it is proposed to preset default settings in order to receive an EPDCCH. These default settings may include the following contents. Characteristically, it may be assumed that the MTC device uses the corresponding default setting only when specific EPDCCH-PRB-set related setting is not received. Afterwards, when EPDCCH-PRB-set related setting is received, and then the received settings may be used.

a) The Number of EPDCCH-PRB-Sets

Two or more EPDCCH-PRB-sets may be unnecessary for an MTC device operating on a reduced bandwidth (e.g., 6 PRBs) rather than an entire system bandwidth of a cell. Thus, it may be assumed that only one EPDCCH-PRB-set exists in the MTC device. However, it may be determined that the additional EPDCCH-PRB-set exists only when the MTC device receives additional EPDCCH-PRB-set related settings.

b) PRB Size of EPDCCH-PRB-Set

The MTC device may assume that a PRB size of the EPDCCH-PRB-set is 6 PRBs. However, when the MTC device receives EPDCCH-PRB-set related setting, the corresponding setting may be applied.

c) Subframe for Monitoring EPDCCH

A location of a subframe resource to which the MTC device should monitor an EPDCCH may be predefined. For example, it may be defined in the form of a period, an interval/duration, and an offset of a subframe.

d) EPDCCH Transmission Type

The MTC device may assume that EPDCCH transmission type of EPDCCH-PRB-set is a specific one of an EPDCCH of localized mapping scheme and an EPDCCH of distributed mapping scheme. For example, the MTC device may assume that a transmission type of EPDCCH-PRB-set is always an EPDCCH of distributed mapping scheme.

Alternatively, the MTC device may attempt blind decoding on the EPDCCH of the localized mapping scheme and the EPDCCH of the distributed mapping scheme.

III. EPDCCH RE Mapping for EPDCCH-PRB-Set Size of 5 PRBs

When an MTC device operates only in a reduced subband (i.e., 6 PRBs or 1.4 MHz), a system bandwidth of a cell may be divided into multiple subbands (i.e., MTC subbands). Hereinafter, a MTC subband is referred to as an 'M-region'.

Figure 16A:
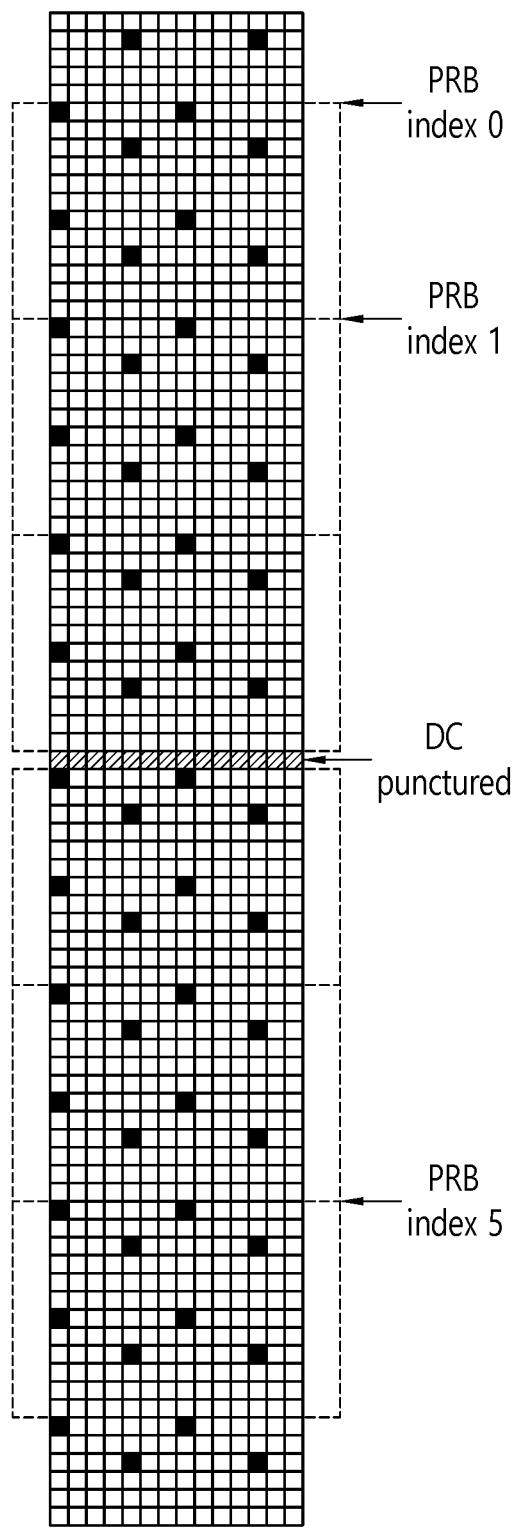
FIGS. 16A and 16B are examples showing allocation of the MTC subband (M-region).
Figure 16B:
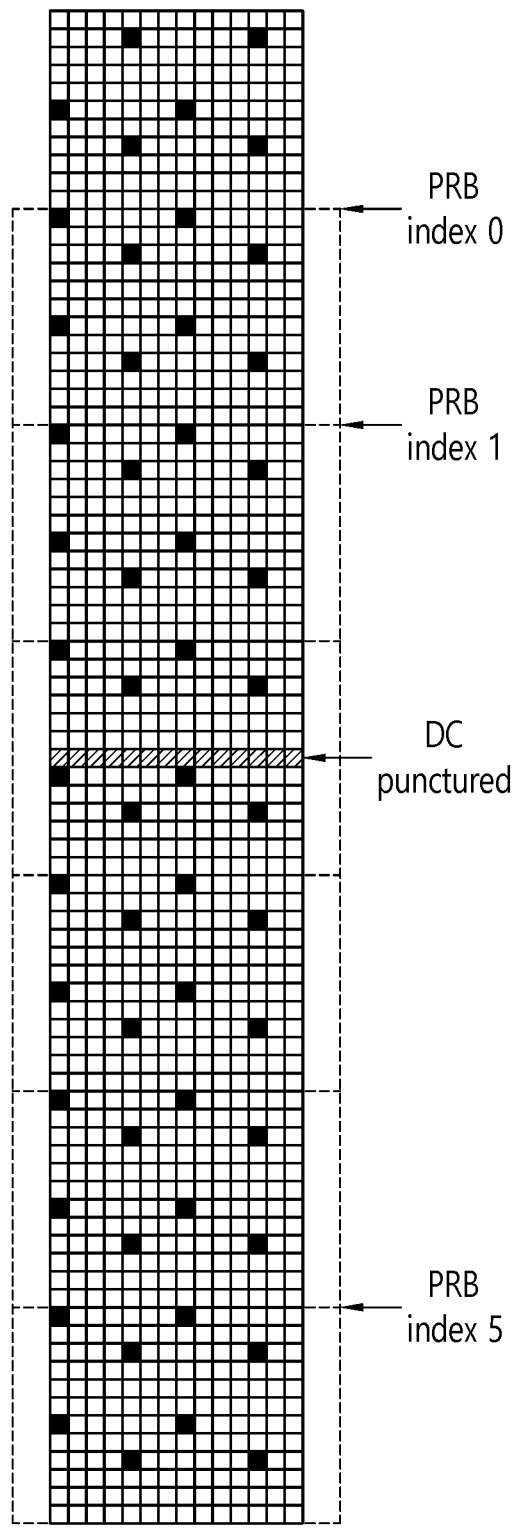

FIGS. 16A and 16B are examples illustrating allocation of the MTC subband (M-region).

When the MTC subband (M-region) is located within 6 PRBs of the system bandwidth of the cell, the MTC subband may or may not be aligned with conventional PRB mappings based on a size of the system bandwidth of the cell (i.e., based on whether the cell's system bandwidth is odd or even PRBs).

For example, as shown in FIG. 16A, when the system bandwidth includes the even number of PRBs (i.e., when the system bandwidth is 1.4 MHz and includes 6 PRBs), a PRB may be not located in a Direct Current (DC) sub-carrier of the system bandwidth.

On the other hand, as shown in FIG. 16B, when the system bandwidth includes odd PRBs (i.e., the system bandwidth is 5 MHz and includes 25 PRBs), and when PRB mapping and MTC subband mapping in the system bandwidth coincides with each other, a PRB within the MTC subband may contain a DC sub-carrier. In this case, the PRB including the DC sub-carrier should be extended to include 13 sub-carriers, instead of 12 sub-carriers. In this case, the PRB including the DC sub-carrier may include 13 subcarriers, and a size of 6 PRBs may exceed 1.4 MHz.

Thus, even if the MTC device supports only 1.4 MHz, the MTC device may use only 5 PRBs. This will be described with reference to FIG. 17A.

Figure 17A:
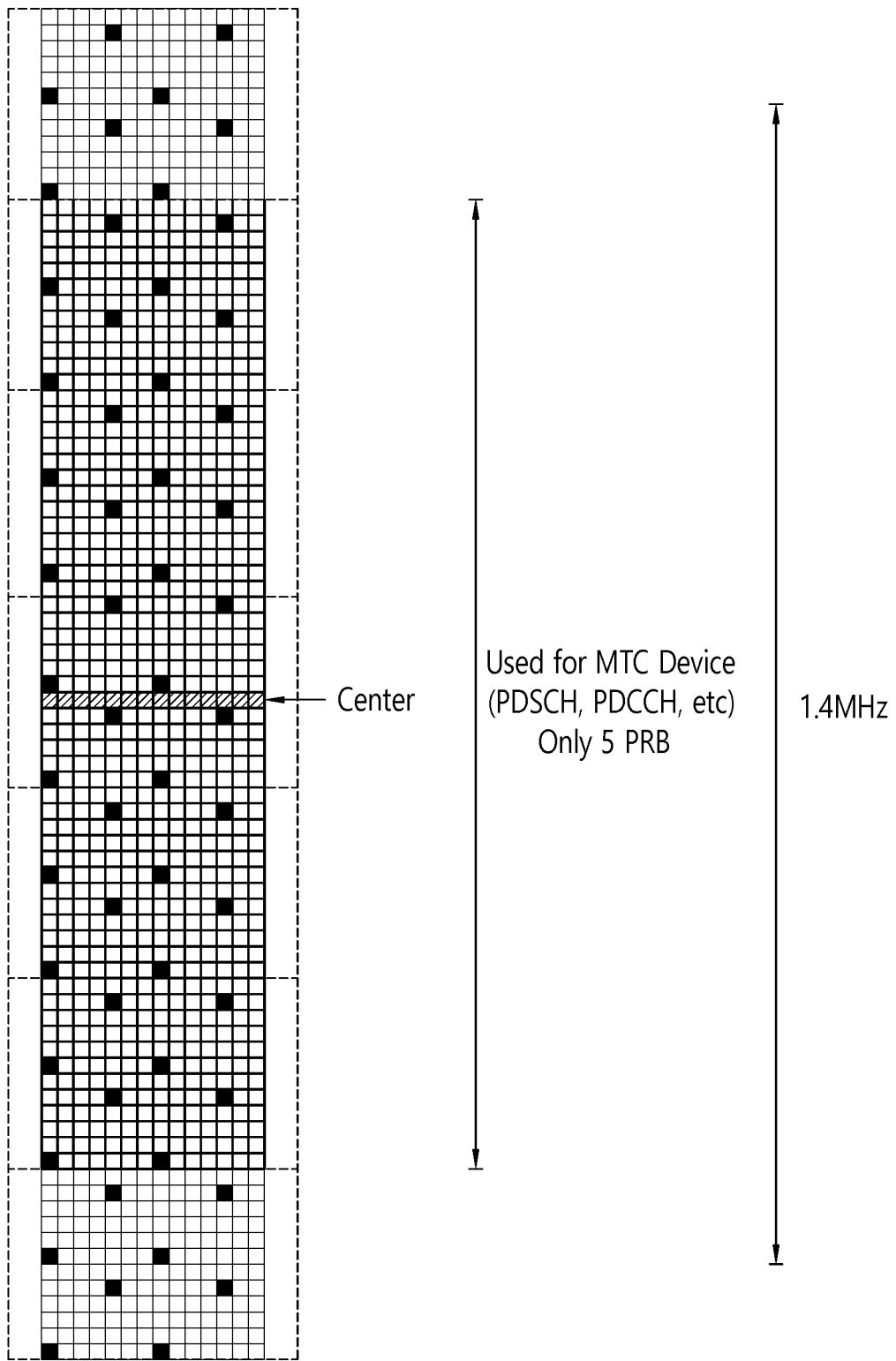
FIG. 17A shows an allocation problem of an MTC sub-band (M-region) when a system bandwidth of a cell includes an odd number of PRBs.
Figure 17B:
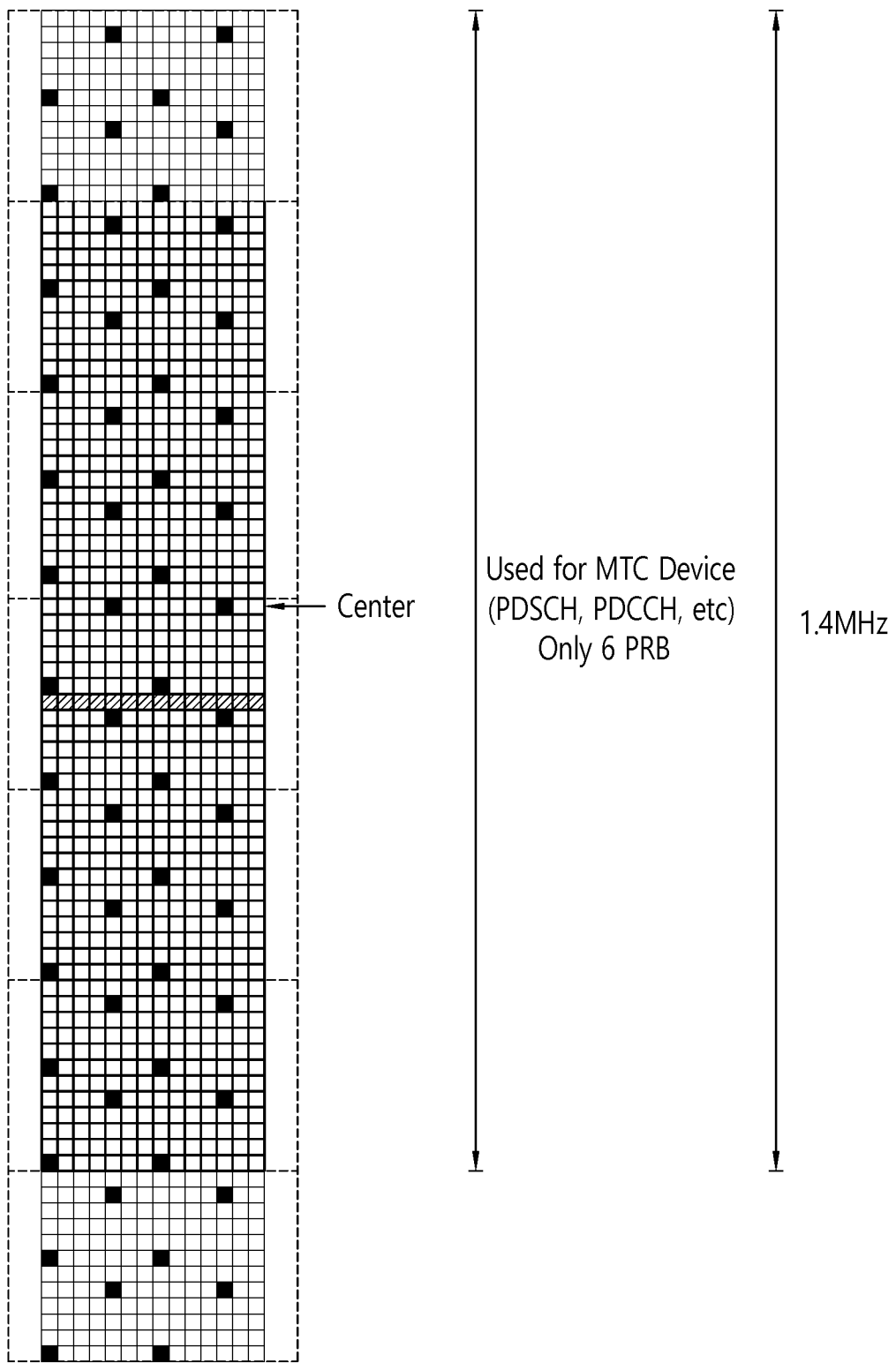
FIG. 17B shows a technique for solving the problem shown in FIG. 17A.

FIG. 17A shows an allocation problem of an MTC subband (M-region) when a system bandwidth of a cell consists of odd PRBs, and FIG. 17B shows a technique for solving the problem illustrated in FIG. 17A.

As illustrated in FIG. 17A, due to a DC subcarrier of a system bandwidth of a cell, the corresponding PRB may include 13 subcarriers, and thus 6 PRBs may exceed 1.4 MHz and an MTC device may use only 5 PRBs.

One way to solve this problem may be to change a boundary of a PRB for the MTC device or to move an MTC subband (M-region) to be aligned with the existing PRB mapping of the cell, as illustrated in FIG. 17B. Here, in order to minimize changes of the base station, it may be most effective to move the MTC subband (M-region) to be aligned with the existing PRB mapping of the cell. Accordingly, even although an MTC subband (M-region) partially matches with center 6 PRBs, a center frequency of the MTC subband (M-region) may be different from a center frequency of the system bandwidth of the cell.

Meanwhile, without an improvement as illustrated in FIG. 17B, when it is assumed that an MTC device uses only 5 RPBs and that the data/control channel can be received only on the 5 PRBs, it is proposed to transmit/receive an EPDCCH in a center subband region.

III-1. EPDCCH PRB Size/Location for Center Subband

In this section, when a system bandwidth of a cell is composed of odd PRBs, and when an MTC device can receive the data/control channel only through 5 PRBs in a center MTC subband, it is proposed to transmit/receive an EPDCCH in the center subband region. Moreover, when there is (exists) an MTC subband where a size of the MTC subband is set to be smaller than 6 PRBs due to the lack of the number of PRBs, it is proposed to transmit/receive the EPDCCH in the corresponding MTC subband region.

When the MTC device is set to an EPRCCH-PRB-set size greater than 6 PRBs (or when an EPDCCH-PRB-set size is used as a PRB size of 6 PRBs or more), it may be assumed that the EPDCCH-PRB-set size is the same as the number of PRBs actually included in an MTC subband including the number of PRBs smaller than 6 PRBs. In this case, when the EPDCCH-PRB-set size is set to 5 PRBs or less (or when the EPDCCH-PRB-set size is used with 5 PRBs or less), the corresponding PRB size may be also used in a center MTC subband region as it is. In this case, in a subband including the number of PRBs smaller than 6 PRBs, when the number of PRBs smaller than actual PRBs included in the corresponding subband is set as the EPDCCH-PRB-set size (or when the number of PRBs smaller than that of PRBs included in the corresponding subband is used as the EPDCCH-PRB-set size), the corresponding PRB size may be also used in a subband including the number of PRBs smaller than 6 PRBs as it is.

Alternatively, the MTC device may receive an EPDCCH PRB size or EPDCCH related setting applied from a base station in a center subband, apart from EPDCCH PRB size setting or the EPDCCH related setting used in the other subband area. At this time, the EPDCCH PRB size applied in the center sub-band may be smaller than or equal to 5 PRBs. The MTC device may receive the EPDCCH PRB size or EPDCCH related setting applied from the base station in a subband including the number of PRBs smaller than 6 PRBs, apart from EPDCCH PRB size setting or EPDCCH related setting used in a normal subband area including 6 PRBs. At this time, the EPDCCH PRB size applied in the subband including the number of PRBs smaller than 6 PRBs may be smaller than or equal to the number of PRBs included in the corresponding subband.

Alternatively, the MTC device may assume that an EPDCCH PRB size applied in a center subband is always 5 PRBs, apart from setting for an EPDCCH PRB size used in the other subband areas. Alternatively, the MTC device may assume that an EPDCCH PRB size applied in a subband including PRBs smaller than 6 PRBs is always a PRB size included in the corresponding subband, apart from setting for a EPDCCH PRB size used in a normal subband area consisting of 6 PRBs. Alternatively, when a PRB location set for reception of an EPDCCH is (exists) within a subband of 6 PRBs, and the corresponding PRB location includes a PRB index #5 among 6 PRB indexes (PRB #0, #1, #2, #3, #4, and #5), the MTC device may exclude PRB index #5 in a center subband from EPDCCH-PRB-set (PRB location set for reception of an EPDCCH). In this case, the EPDCCH-PRB-set size may become smaller by 1 than a size received by the MTC device. Alternatively, when a PRB location set for reception of an EPDCCH is (exists) within a subband of 6 PRBs, and the corresponding PRB location indicates a PRB region (area) which does not exist in a subband including PRBs small than 6 PRBs, the MTC device may exclude a PRB region that does not exist in a subband including the number of PRBs smaller than 6 PRBs from EPDCCH-PRB-set (PRB location set for reception of an EPDCCH). In this case, the EPDCCH-PRB-set size in a subband containing the number of PRBs smaller than 6 PRBs may be smaller than an EPDCCH-PRB-set size used within a subband of 6 PRBs.

Alternatively, when data/control channel can be received only through the 5 PRBs in a center subband (when the system bandwidth of the cell is odd PRBs), the MTC device may assume that an EPDCCH is not transmitted in the corresponding subband. Furthermore, when there is (exists) a subband that does not include 6 PRBs, it may be assumed that EPDCCH is not transmitted in the corresponding subband. Alternatively, when an EPRCCH-PRB-set size is set to a size of 6 PRBs (or more) for EPDCCH reception (or when a size of 6 PRBs (or more) is used as the EPDCCH-PRB-set size), and it is possible to receive data/control channels only through 5 PRBs in a center subband (when a system bandwidth of a cell is odd PRBs), the MTC device may assume that an EPDCCH is not transmitted in the corresponding subband.

Alternatively, when the EPDCCH-PRB-set size is set to 6 PRBs (or more) for EPDCCH reception (or when 6 PRBs (or more) are used as the EPDCCH-PRB-set size), the MTC device may assume that EPDCCH is not transmitted in a subband including only PRBs smaller than 6 PRBs.

III-2. EPDCCH RE Mapping for EPDCCH-PRB-Set Size of 5 PRBs

The description in this section may apply to not only a center subband but also a subband including PRBs smaller than 6 PRBs as it is.

To support EPDCCH-PRB-set of 5 PRBs in the center subband, the MTC device operates by assuming EPDCCH- PRB-set of 6 PRBs used in the other subband, the MTC device may assume that EPDCCH is rate-matched (or punctured) in the corresponding resource area with respect to a resource area (RE) that does not exist in the center subband.

Alternatively, to support EPDCCH-PRB-set of 5 PRBs in the center subband, the MTC device may operate by assuming EPDCCH-PRB-set of 8 PRBs supported by the existing EPDCCH, and thus the MTC device may assume that EPDCCH is rate-matched (or punctured) in the corresponding resource area for a resource area (RE) that does not exist in the center subband.

To support EPDCCH-PRB-set of 5 PRBs, the existing EREG to RE mapping and ECCE to EREG mapping may be used as much as possible as it is.

EREGs included in ECCE may be determined by applying the existing equations described in Section I-2-1 as it is.

However, in the case of distributed mapping, when the above formula is applied to an EPDCCH-PRB-set size of 6 PRBs as it is, and when a value of $N^{EREG}_{ECCE}$ is 4, there may be problem that $N^{Sm}_{RB}/N^{EREG}_{ECCE}$ in the existing formula is not an integer. To this end, even though $N^{Sm}_{RB}/N^{EREG}_{ECCE}$ in the existing formula applies a floor to be changed to $\lfloor N_{RB}^{Sm}/N_{ECCE}^{EREG} \rfloor$ by applying the floor, or applies a ceil to be changed to $\lfloor N_{RB}^{Sm}/N_{ECCE}^{EREG} \rfloor$, there may be a problem that do not include all 5 PRB regions. Accordingly, this section proposes that a part jmax(1, $N_{RB}^{Sm}/N_{ECCE}^{EREG}$) of the above formula is changed to j. Alternatively, it may be suggested that a jmax(1, $N_{RB}^{Sm}/N_{ECCE}^{EREG}$) portion should be modified to indicate 2j+1 when $N^{EREG}_{ECCE}$ is 4.

Meanwhile, when an EPDCCH-PRB-set size is 5 PRBs, a value of a maximum aggregation level (AL) in which an EPDCCH is transmitted may be 20 aggregation levels (ALs).

As described so far, embodiments of the present invention may be implemented by various means. For example, embodiments of the present invention may be implemented by hardware, firmware, software or a combination thereof. Specifically, it will be described with reference to the drawings.

FIG. 18 is a block diagram illustrating a wireless communication system in which the present disclosure is implemented.

The base station 200 may include a processor 201, a memory 202 and an radio frequency (RF) unit 203. The memory 202 may connected to the processor 201 and stores various information for driving the processor 201. The RF unit 203 may be connected to the processor 201 to transmit and/or receive a wireless (or radio) signal. The processor 201 may implement the proposed functions, procedures and/or methods. In the above-described embodiment, the operation of the base station may be implemented by the processor 201.

The MTC device 100 may include a processor 101, a memory 102, and an RF unit 103. The memory 102 may connected to the processor 101 and stores various information for driving the processor 101. The RF unit 103 may be connected to the processor 101 to transmit and/or receive a radio signal. The processor 101 may implement the proposed functions, procedures and/or methods.

The processor may include application-specific integrated circuits (ASICs), other chipsets, logic circuits, and/or data processors. The memory may include read-only memory (ROM), random access memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the exemplary system described above, although the methods are described on the basis of a flowchart as a series of steps or blocks, the present invention is not limited to the order of the steps, and some steps may occur in a different order or in a different order than the steps described above. In addition, it will also be understood by those skilled in the art that the steps shown in the flowchart are not exclusive and that other steps may be included or that one or more steps in the flowchart may be deleted without affecting the scope of the invention.

What is claimed is:

1. A method for receiving a downlink (DL) control channel in a machine type communication (MTC) device set to operate only in only a partial band of a system band of a cell, the method comprising:
    comparing a number of first physical resource block (PRB) pairs with a number of second PRB pairs,
    wherein the first PRB pairs represent PRB pairs for which the downlink control channel is expected to be mapped,
    wherein the number of the first PRB pairs is one of 2, 4 and 8, and
    wherein the second PRB pairs represent PRB pairs to which the DL control channel is actually mapped;
    when the number of the first PRB pairs is greater than the number of the second PRB pairs, determining that the DL control channel is not included in a PRB pair other than the number of the second PRB pairs,
    wherein the number of the second PRB pairs is one of 1, 3, and 6 when the MTC device is configured to use only 6 PRBs of the system band of the cell; and
    receiving the DL control channel only by the number of the second PRB pairs based on the determining.

2. The method of claim 1, further comprising receiving a configuration representing that the number of the first PRB pairs is one of 2, 4, and 8.

3. The method of claim 1, wherein the determining comprises:
    determining that the DL control channel is punctured in 2 PRB pairs, or that the DL control channel is rate-matched except for the 2 PRB pairs when the number of the first PRB pairs, which is 8, is greater than the number of the second PRB pairs, which is 6.

4. The method of claim 1, wherein the determining comprises:
    determining that the DL control channel is punctured in one PRB pair, or that the DL control channel is rate-matched except for the one PRB pair when the number of the first PRB pairs, which is 4, is greater than the number of the second PRB pairs, which is 3.

5. The method of claim 1, wherein the determining comprises:
    determining that the DL control channel is punctured in one PRB pair, or that the DL control channel is rate-matched except for the one PRB pair, when the number of the first PRB pairs, which is 2, is greater than the number of the second PRB pairs, which is 1.

6. A machine type communication (MTC) device that receives a downlink control channel when the MTC device is set to operate only in a partial band of a system band of a cell, the MTC device comprising:

a transceiver; and a processor configured to control the transceiver and configured to:

compare a number of first physical resource block (PRB) pairs with a number of second PRB pairs, wherein the first PRB pairs represent PRB pairs for which the downlink control channel is expected to be mapped, wherein the number of the first PRB pairs is one of 2, 4 and 8, and wherein the second PRB pairs represent PRB pairs to which the downlink control channel is actually mapped;

when the number of the first PRB pairs is greater than the number of the second PRB pairs, determine that the downlink control channel is not included in a PRB pair other than the number of the second PRB pairs, wherein the number of the second PRB pairs is one of 1, 3, and 6 when the transceiver is configured to use only 6 PRBs of the system band of the cell; and receive the downlink control channel only by the number of the second PRB pairs based on the determination.

7. The MTC device of claim 6, wherein the transceiver receives a configuration representing that the number of the first PRB pairs is one of 2, 4, and 8.

8. The MTC device of claim 6, wherein the processor is configured to determine that the downlink control channel is punctured in 2 PRB pairs, or that the downlink control channel is rate-matched except for the 2 PRB pairs, when the number of the first PRB pairs, which is 8, is greater than the number of the second PRB pairs, which is 6.

9. The MTC device of claim 6, wherein the processor is configured to determine that the downlink control channel is punctured in one PRB pair, or that the downlink control channel is rate-matched except for the one PRB pair, when the number of the first PRB pairs, which is 4, is greater than the number of the second PRB pairs, which is 3.

10. The MTC device of claim 6, wherein the processor is configured to determine that the downlink control channel is punctured in one PRB pair, or that the downlink control channel is rate-matched except for the one PRB pair, when the number of the first PRB pairs, which is 2, is greater than the number of the second PRB pairs, which is 1.

* * * * *